(12) United States Patent
Markley et al.

(10) Patent No.: US 8,347,341 B2
(45) Date of Patent: Jan. 1, 2013

(54) METHODS AND APPARATUS FOR CENTRALIZED CONTENT AND DATA DELIVERY

(75) Inventors: Jeffrey P. Markley, Golden, CO (US); Louis D. Williamson, Denver, CO (US); John B. Carlucci, Boulder, CO (US)

(73) Assignee: Time Warner Cable Inc., New York, NY (US)

( * ) Notice: Subject to any disclaimer, the term of this patent is extended or adjusted under 35 U.S.C. 154(b) by 545 days.

(21) Appl. No.: 11/378,129

(22) Filed: Mar. 16, 2006

(65) Prior Publication Data

US 2007/0217436 A1  Sep. 20, 2007

(51) Int. Cl.
*H04N 7/18* (2006.01)
(52) U.S. Cl. .............................. 725/82; 725/80; 725/85
(58) Field of Classification Search .................... 725/74, 725/78, 80, 81, 82, 85, 203, 216, 217, 227, 725/229, 231; 380/203, 216, 217, 227, 229, 380/231; 726/26, 27, 29, 31, 33
See application file for complete search history.

(56) References Cited

U.S. PATENT DOCUMENTS

| | | | |
|---|---|---|---|
| 7,127,734 B1 | 10/2006 | Amit | |
| 7,142,128 B2 | 11/2006 | Kobayashi | |
| 7,181,010 B2 | 2/2007 | Russ | |
| 7,200,683 B1 | 4/2007 | Wang | |
| 7,257,821 B2 | 8/2007 | Wendorf | |
| 7,266,726 B1 | 9/2007 | Ladd | |
| 7,293,236 B2 | 11/2007 | Choi | |
| 7,340,769 B2 * | 3/2008 | Baugher | 726/5 |
| 2002/0019984 A1 * | 2/2002 | Rakib | 725/111 |
| 2002/0048275 A1 | 4/2002 | Atwater | |
| 2003/0028887 A1 * | 2/2003 | Frouin et al. | 725/78 |
| 2003/0056217 A1 | 3/2003 | Brooks | |
| 2003/0217365 A1 | 11/2003 | Caputo | |
| 2003/0221100 A1 | 11/2003 | Russ et al. | |
| 2004/0163130 A1 | 8/2004 | Gray et al. | |
| 2005/0114900 A1 | 5/2005 | Ladd | |
| 2005/0210101 A1 * | 9/2005 | Janik | 709/203 |
| 2005/0216949 A1 | 9/2005 | Candelora et al. | |
| 2005/0278755 A1 | 12/2005 | Kuo et al. | |
| 2006/0020786 A1 | 1/2006 | Helms | |
| 2006/0020950 A1 | 1/2006 | Ladd | |
| 2006/0041923 A1 | 2/2006 | McQuaide, Jr. | |
| 2006/0047957 A1 | 3/2006 | Helms | |

(Continued)

FOREIGN PATENT DOCUMENTS

EP        1089538 A1      4/2001

(Continued)

*Primary Examiner* — John Schnurr
(74) *Attorney, Agent, or Firm* — Gadzinski & Associates, PC

(57) ABSTRACT

Methods and apparatus for centralized content, media and data delivery and access within a premises such as, e.g., a residence. In one embodiment, the apparatus comprises a remotely manageable premises device that acts as a centralized client networking platform, providing gateway services such as network management as well as traditional content and high-speed data delivery functions. The device also acts as the shared internet connection for all devices in the premises via a cable modem, sharing personal and DVR content such as video, music and photos (and any associated metadata) throughout the premises, and providing both a wired and wireless network in the home. Telephony services utilizing e.g., embedded multimedia terminal adapter (eMTA) and/ or Wi-Fi architectures may also be provided via the device. The device can also provide a trusted domain for content or data, as well as allowing a subscriber total mobility in the home.

27 Claims, 9 Drawing Sheets

U.S. PATENT DOCUMENTS

| | | |
|---|---|---|
| 2006/0130107 A1 | 6/2006 | Gonder |
| 2006/0130113 A1 | 6/2006 | Carlucci |
| 2006/0187957 A1* | 8/2006 | Devine et al. ............... 370/466 |
| 2006/0190974 A1 | 8/2006 | Lee |
| 2006/0218604 A1 | 9/2006 | Riedl |
| 2006/0230128 A1 | 10/2006 | Chung |
| 2007/0061407 A1 | 3/2007 | Zondag |
| 2007/0094691 A1 | 4/2007 | Gazdzinski |
| 2007/0139188 A1 | 6/2007 | Ollis |
| 2007/0153820 A1 | 7/2007 | Gould |
| 2007/0168051 A1 | 7/2007 | Bronnenberg |
| 2007/0204314 A1 | 8/2007 | Hasek |
| 2009/0052440 A1* | 2/2009 | Pfeffer et al. ............... 370/352 |

FOREIGN PATENT DOCUMENTS

| | | |
|---|---|---|
| WO | WO 0133790 A1 | 5/2001 |
| WO | WO 0156297 A1 | 8/2001 |
| WO | WO 0221841 A1 | 3/2002 |
| WO | WO 2004102344 A2 | 11/2004 |

* cited by examiner

METHODS AND APPARATUS FOR CENTRALIZED CONTENT AND DATA DELIVERY

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is related to apparatus and methods for distributing programming content, media, data and other information services via a substantially centralized apparatus disposed on a user premises (e.g., residence, enterprise, etc.).

2. Description of Related Technology

Recent advances in digital information processing have made a whole range of services and functions available for delivery to consumers at their premises for very reasonable prices or subscription fees. These services and functions include digital programming (movies, etc.), digital video-on-demand (VOD), personal video recorder (PVR), Internet Protocol television (IPTV), digital media playback and recording, as well high speed internet access and IP-based telephony (e.g., VoIP). Other services available to network users include access to and recording of digital music (e.g., MP3 files), as well local area networking (including wire-line and wireless local area networks) for distributing these services throughout the user's premises, and beyond.

Currently, many of these services are provided and delivered to the user via a wide variety of different equipment environments including, inter alia, cable modems, Wi-Fi hubs, Ethernet hubs, gateways, switches and routers, computers, servers, cable set-top boxes, PSTNs, cellular telephones/smartphones, PDAs, and portable digital music devices such as the Apple iPod™. Additionally, the services associated with such technology are typically provided by multiple vendors including e.g., a cable service provider (e.g., MSO), cellular service provider (CSP), wireless service provider (WSP), VoIP service provider, music download service, Internet service provider (ISP), PSTN telephone service, etc.

The myriad of services, equipment and providers can easily create confusion and economic inefficiency for someone using many of these services on a regular basis. In particular, a user may have to pay for each service or equipment separately, thus eliminating any economies of scale based on integration. Additionally, the equipment or services may not interoperate with one another, thus reducing the overall utility provided to the user, and increasing their frustration level. These problems are particularly acute when the number of different services utilized (and hence number of service providers) is high.

The user must also typically learn and recall a number of different user interfaces on a regular basis; for example, their cable TV EPG or navigator will use different menus and features than their PDA, which will be different than those on their PC, which will be different than those on their telephony system, and so forth.

Some improvements in digital service integration have been made over time. For example, cable system subscribers (such as those of the Assignee hereof) can now access VOD, PVR, PPV and broadcast services simultaneously, as well a Internet access via cable modem, and even digital telephony (e.g., VoIP). However, these functions are still substantially disparate in terms of their hardware and software environments (i.e., the user must have a cable modem, set-top box, VoIP telephony unit, PC, etc.), and "cross-over" between the environments (e.g., moving content or data from one environment to the other) is quite limited.

Furthermore, conditional access (CA) paradigms currently in use are quite restricted, and not generally extensible beyond the user's set-top box. So, for example, the user would be prohibited from transferring streamed or downloaded content to their Wi-Fi enabled laptop or PC, since proper conditional access support does not exist in these devices.

Prior art approaches also generally do not provide remote configuration, provisioning, monitoring, or troubleshooting capability, which significantly reduces the network operator's ability to, inter alia, reconfigure the device after installation, adjust its operation, or assess its performance or failure.

Thus, improved apparatus and methods for distributing digital services to and within a user premises are needed. Such improved apparatus and services would ideally provide users with a number of diverse digital services at a competitive price, and in a more integrated and unified fashion, thereby simplifying user access to the services, and allowing for substantially unrestricted cross-over between different hardware and software environments. For example, the user or subscriber would be provided with a converged home network environment wherein media (whether personal in nature, data files, protected video content, or otherwise) would be easily and transparently available to any relevant personal media device (PMD) within the premises, subject to any authentication or other content protection or distribution restrictions.

This integrated and unified access would also allow for remote, centralized management and configuration, as well as extension of the conditional access environment outside of merely the user's set-top box or other such consumer premises equipment (CPE).

SUMMARY OF THE INVENTION

The present invention addresses the foregoing needs by disclosing a system and method for distributing programming, data, media and other information services via a substantially centralized architecture coupled to a content-based network.

In a first aspect of the invention, a system for media distribution over a network having at least first and second nodes is disclosed. In one embodiment, the system comprises: a first interface disposed at the first node; an authentication server in communication with the first interface; a gateway management server in communication with the first interface; a protocol server in communication with the first interface; a network interface in communication with the first interface and providing access to an internet; and a substantially converged gateway apparatus disposed at the second node, the gateway apparatus comprising: a second interface for communication with the first interface over the network; a wireless interface adapted for wireless communication at least proximate the second node; a coaxial cable interface adapted for communication of data over coaxial cabling disposed at the second node; and a telephony interface in data communication with the second interface, the telephony interface being configured to transmit packetized voice data to the first interface via the second interface.

In one variant, the first node comprises a cable system head-end or switching hub, and the interface comprises a cable modem termination system (CMTS); the second node comprises a residence or business enterprise, and the second interface comprises a DOCSIS-compliant cable modem.

In another variant, the coaxial cable interface comprise a MoCA-compliant Ethernet-over-cable interface, and the wireless interface comprises an IEEE Std. 802.11-compliant interface capable of acting as an Access Point (AP).

In another variant, the first node comprises a hub within a broadcast switched architecture (BSA) network.

In a second aspect of the invention, premises content distribution apparatus for use with a plurality or media-capable devices is disclosed. In one embodiment, the apparatus comprises: a first interface capable of at least receiving media content from a first network; a mass storage device in data communication with the first interface and adapted to store at least a portion of the media content; a coaxial cable interface configured to provide networking throughout at least a portion of the premises over coaxial cable present therein; and a wireless access interface adapted to support at least one wireless network substantially within the premises; wherein the media content is accessible to users on both the coaxial cable network and the at least one wireless network. In one variant, the apparatus provides a shared internet connection for all of the media-capable devices in the premises, such as via a cable modem (CM). Networking over the coaxial cable comprises Ethernet-over-coaxial networking.

In another variant, the apparatus further comprises apparatus configured to communicate with the first interface to pass IP-based telephony data between a user of the premises and the first network, such as an embedded multimedia terminal adapter (eMTA).

The apparatus can also provide a trusted domain for content received over the first interface.

In a third aspect of the invention, content distribution apparatus adapted to deliver media content to a plurality of media devices within a premises is disclosed. In one embodiment, the apparatus comprises: network interface apparatus configured to interface the distribution apparatus with a network, the distribution apparatus receiving at least a portion of the media content over the interface; and media server apparatus adapted to distribute the media content to a plurality of media devices within the premises. In one variant, the media server apparatus comprises a Universal Plug and Play (UPnP) media server, and the media content comprises content which does not require rights management or copy protection.

In another variant, the media content comprises an associated security data, the security data being used authenticate the content source to at least one of the media devices. Alternatively, the security data is used authenticate at least one of the media devices to the distribution apparatus before the media content can be rendered or recorded by the at least one device.

In a fourth aspect of the invention, a method of providing data services within a substantially localized premises is disclosed. In one embodiment, the method comprises: providing a substantially centralized gateway in data communication with a content-based network, the gateway comprising a mass storage device and a plurality of data interfaces; disposing content on the mass storage device; and selectively distributing the content via at least one of the plurality of interfaces to one or more media devices disposed within the premises. In one variant, the at least one interface comprises a coaxial cable interface, and the act or distributing comprises distributing packetized data over coaxial cabling installed within the premises to the one or more media devices. The act of disposing content comprises: receiving content requiring protection via an interface with the content-based network; and disposing the content on the mass storage device such that the content cannot be accessed by the one or more media devices without proper authentication.

In another variant, the gateway further comprises a wireless interface and a cable modem interface to the content-based network, the wireless interface being in data communication with the cable modem interface, and the method further comprises passing IP data packets between a wireless mobile device and the content-based network via the wireless and cable modem interfaces.

In a fifth aspect of the invention, a method of doing business over a content-based network is disclosed. In one embodiment, the method comprises: providing a plurality of substantially centralized gateways, each in data communication with a content-based network, the gateways each comprising at least one network interface and a plurality of interfaces configured to communicate with media devices within a respective premises where the gateway is installed; and selectively configuring at least a portion of the plurality of gateways, including configuring at least one of the interfaces, based on subscriber preferences and capabilities within the premises. In one variant, the method further comprises bundling services associated with two or more of the interfaces together into at least one common service subscription package. In another variant, the act of selectively configuring comprises remotely configuring, from a network operator facility, or more operational parameters of the at least one interface of the at least portion of the plurality of gateways, and further comprises remotely enabling, from a network operator facility, a voice-over-packet telephony interface via the network interface.

In another variant, the act of selectively configuring comprises remotely assigning, from a network operator facility, at least one network address within a coaxial cable network disposed at the premises and in signal communication with a respective one of the gateways.

In a sixth aspect of the invention, a converged premises apparatus for processing and distributing digital information is disclosed. In one embodiment, the apparatus comprises: a non-volatile storage device for storing software instructions; a microprocessor in data communication with the storage device configured to execute commands in response to the software instructions and for processing data; a wireless interface in data communication with the microprocessor capable of exchanging radio frequency with an external wireless apparatus; a network interface in data communication with the microprocessor capable of exchanging data with one or more external devices according to a packetized network protocol; and at least one radio frequency tuner configured to interface with an external radio frequency network, the radio frequency network being able to deliver media via one or more modulated radio frequency carriers; wherein the non-volatile storage unit is configured to store media files accessible to one or more external devices located within the premises via one or more of the wireless or network interfaces.

In a seventh aspect of the invention, consumer premises equipment (CPE) adapted to distribute content to one or more viewing locations within a premises is disclosed. In one embodiment, the apparatus comprises: apparatus adapted to receive video content delivered from a content source; a mass storage device in data communication with the apparatus and adapted to store the video content; and at least one interface in data communication with a premises network with which the viewing locations are also in data communication; wherein the video content can be securely delivered to any of the viewing locations that share a common security model via the premises network. In one variant, the CPE further comprises: a web server process running on a microprocessor of the CPE; and a remote application adapted to enable content upload, rendering and management operations on the CPE via the at least one interface of the CPE; wherein the application is operated in part using the web server process.

In an eighth aspect of the invention, network apparatus useful in remotely managing and configuring the aforementioned CPE is disclosed. In one embodiment, the network apparatus comprises a cable modem termination system (CMTS) disposed at, e.g., a cable system head-end or switching hub, comprising software processes running thereon and adapted to remotely access, monitor, and configure the parameters of the CPE and any associated premises network (e.g., packet-over-cable network based on installed coaxial cabling within the premises).

These and other aspects of the invention shall become apparent when considered in light of the disclosure provided herein.

DETAILED DESCRIPTION OF THE INVENTION

Figure 1:
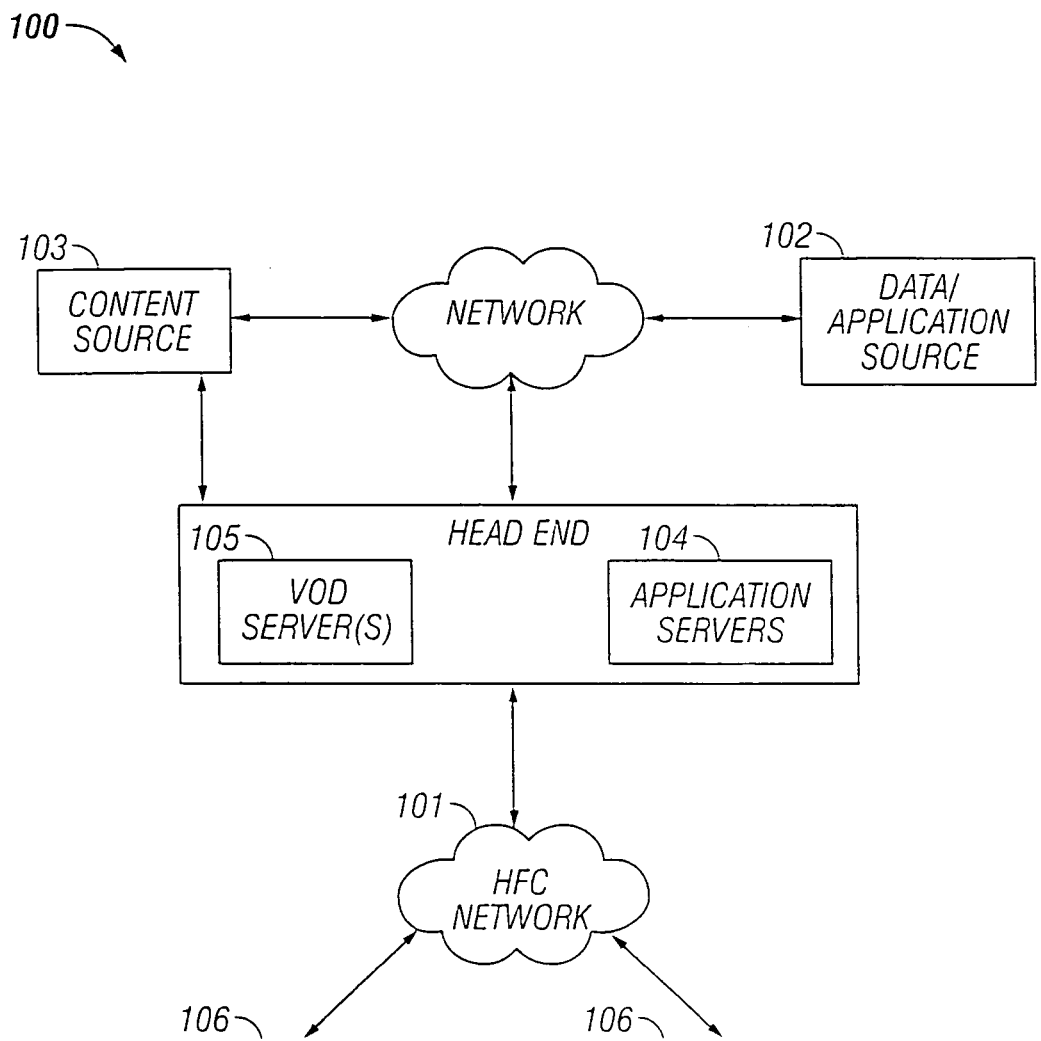
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein the term "browser" refers to any computer program, application or module which provides network access capability including, without limitation, Internet browsers adapted for accessing one or more websites or URLs over the Internet, as well as any "user agent" including those adapted for visual, aural, or tactile communications.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™ or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components. As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the terms "radio area network" or "RAN" refer generally to any wireless network including, without limitation, those complying with the 3GPP, 3GPP2, GSM, IS-95, IS-54/136, IEEE Std. 802.11, Bluetooth, WiMAX, IrdA, or PAN (e.g., IEEE Std. 802.15) standards. Such radio networks may utilize literally any air interface, including without limitation DSSS/CDMA, TDMA, FHSS, OFDM, FDMA, or any combinations or variations thereof including any linear or non-linear transform of RF signals using data to be transmitted.

As used herein, the term "server" refers to any computerized component, system or entity regardless of form which is adapted to provide data, files, applications, content, or other services to one or more other devices or entities on a computer network.

As used herein, the term "speech recognition" refers to any methodology or technique by which human or other speech can be interpreted and converted to an electronic or data format or signals related thereto. It will be recognized that any number of different forms of spectral analysis such as, without limitation, MFCC (Mel Frequency Cepstral Coefficients) or cochlea modeling, may be used. Phoneme/word recognition, if used, may be based on HMM (hidden Markov modeling), although other processes such as, without limitation, DTW (Dynamic Time Warping) or NNs (Neural Networks) may be used. Myriad speech recognition systems and algorithms are available, all considered within the scope of the invention disclosed herein.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11a/b/g/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention comprises a remotely manageable premises device that, inter alia, acts as a centralized client networking platform providing gateway services such as network management as well as traditional content and high-speed data delivery functions. This premises device may be used, for example, in a home or residential environment, enterprise or corporate environment, military or government environment, or combinations of the foregoing. The device also acts as the shared internet (e.g., Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or Wi-Fi architectures may also be provided via the device; these services can make use of the network operator's indigenous VoIP or comparable telephony capability if desired, thereby providing an even more unified service environment.

The converged premises device can also provide a trusted domain for content or data, as well as allowing a subscriber total mobility in the home by not limiting content or data to any one viewing/access location. For example, content or data may be accessed on any monitor in the premises, as well as on a PC or personal media device (PMD).

A wired home network utilizing existing coaxial cable in the premises is also created, using e.g., an Ethernet-to-coaxial bridge technology based on the MoCA specification. This will allow existing devices and DVRs to connect and share content with the CPE, and also allows the network operator (e.g., MSO) to control and manage the premises coaxial network.

The CPE is also advantageously accessible via any remote device with internetworking (e.g., Internet) capability, thereby allowing personal content to be accessed by the user from outside the premises.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Network—

FIG. 1 illustrates a typical content-based network configuration with which the unified network apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Exemplary embodiments of the "unified" CPE of the invention are described subsequently herein with respect to FIGS. 2 and 3.

Figure 1A:
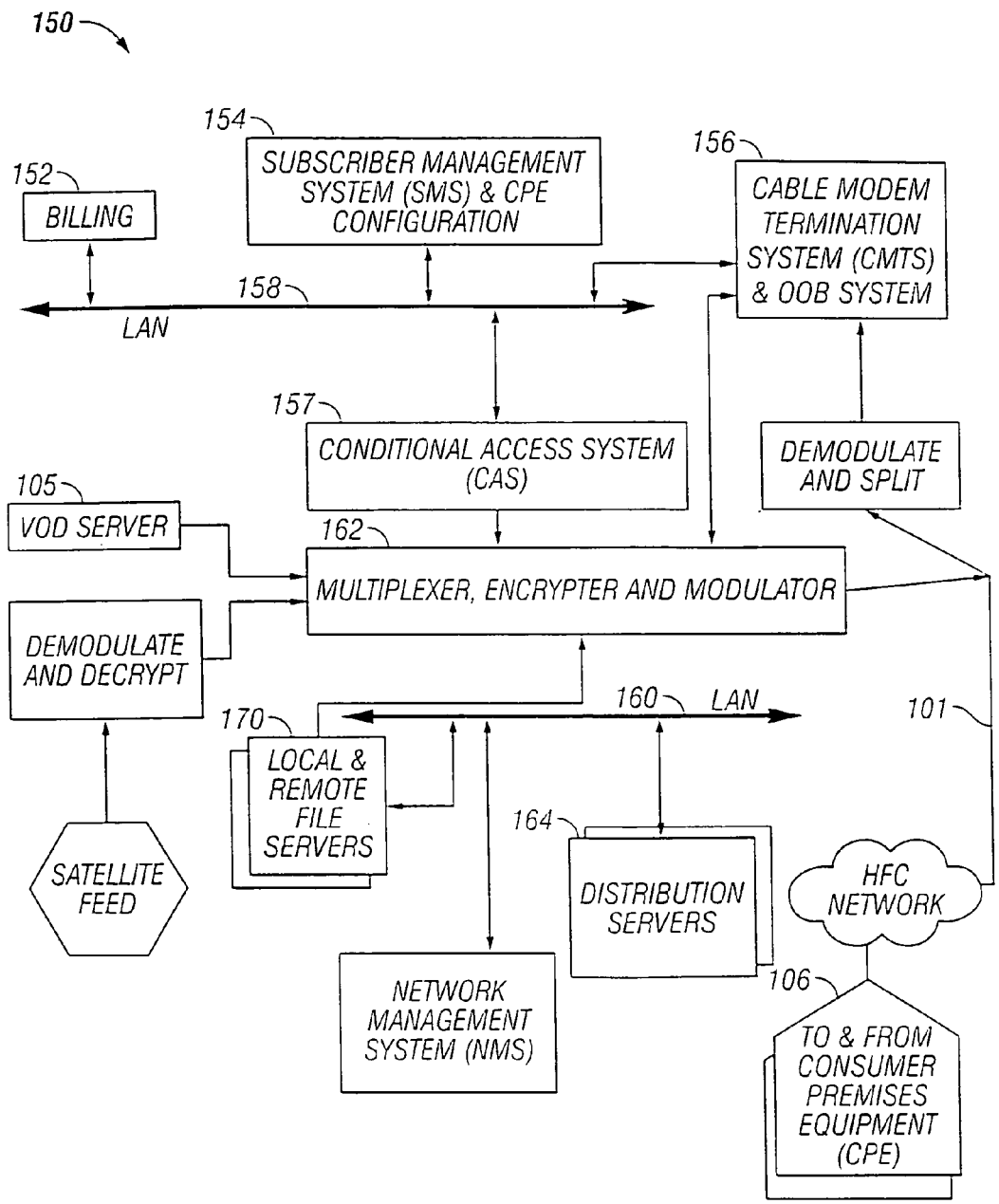
FIG. 1*a* is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
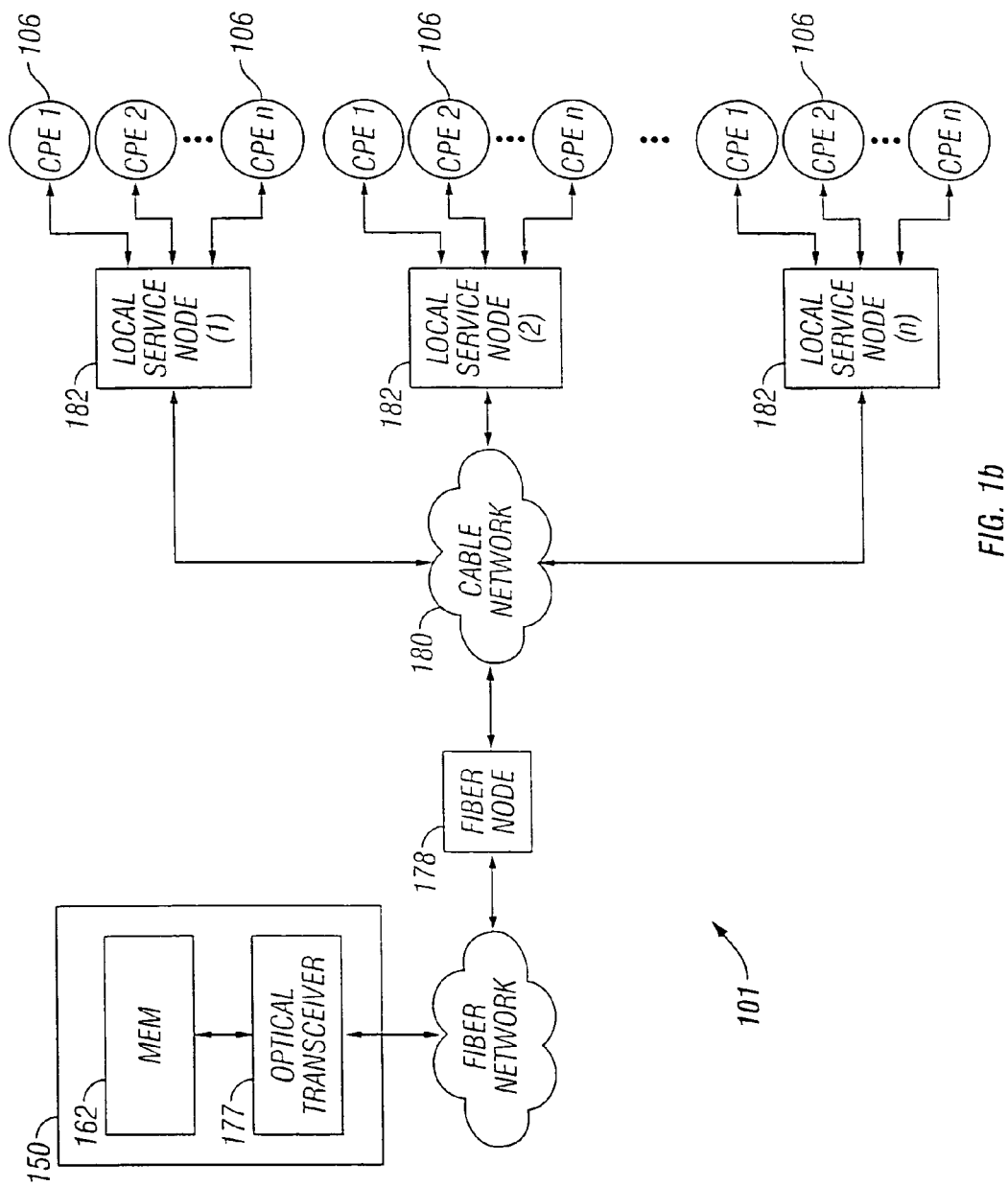
FIG. 1*b* is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
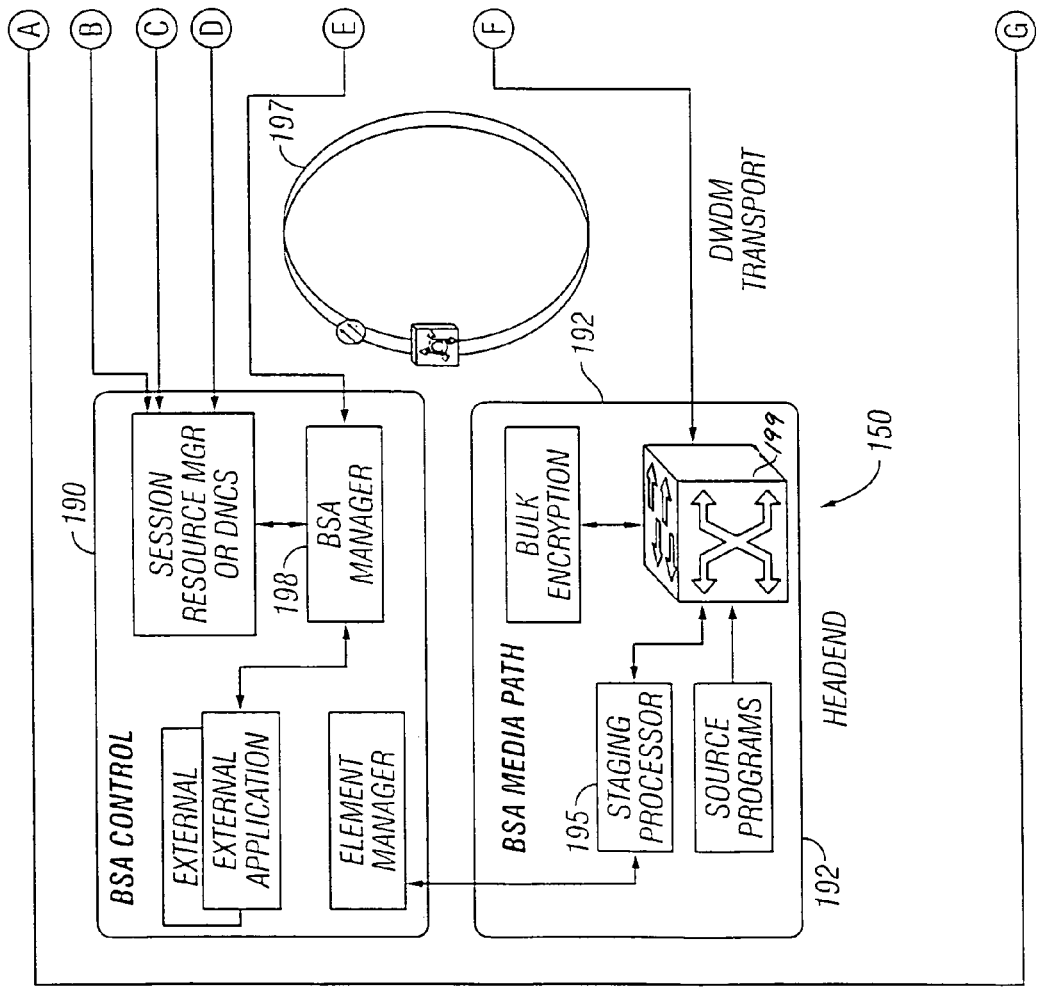
FIG. 1*c* is a functional block diagram illustrating one exemplary broadcast switched architecture (BSA) network useful with the present invention.
Figure 1C:
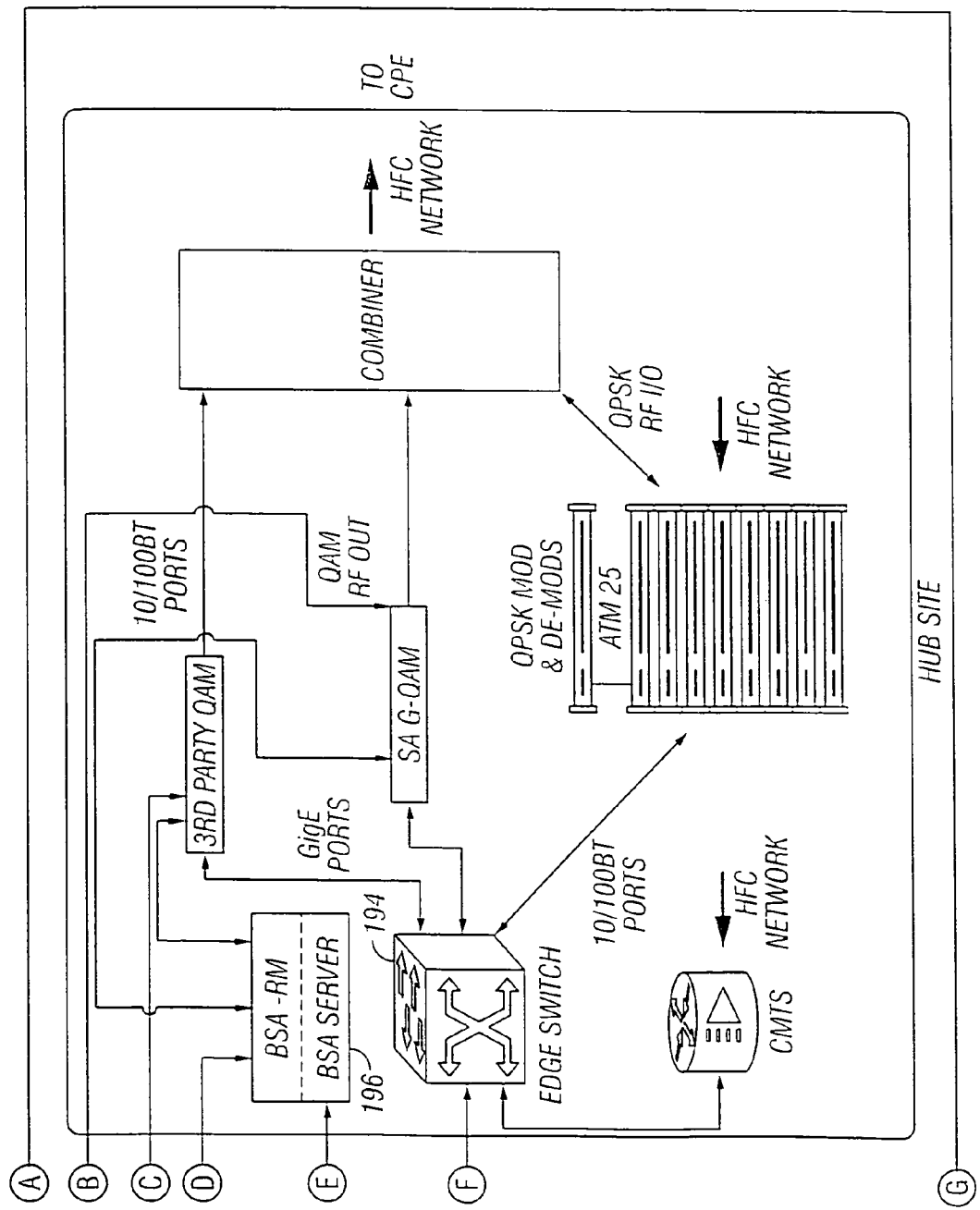

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while the exemplary embodiments presented herein are described in the context of Internet services that include multicast and unicast data, the present invention is applicable to other types of services that include multicast transmission of data delivered over a network having multiple physical channels or even virtual or logical channels. For example, switching between various physical channels that comprise a virtual channel, can itself be conducted according to the "switched" approach of the present invention. As a simple illustration, if a first virtual channel is comprised of physical channels (e.g., QAMs) A, B and D, and a second virtual channel is comprised of QAMs C, E and F, a CM or other CPE can be configured to switch between the A/B/D and C/E/F virtual channels as if they were a single QAM.

"Converged" Premises Network—

Figure 2:
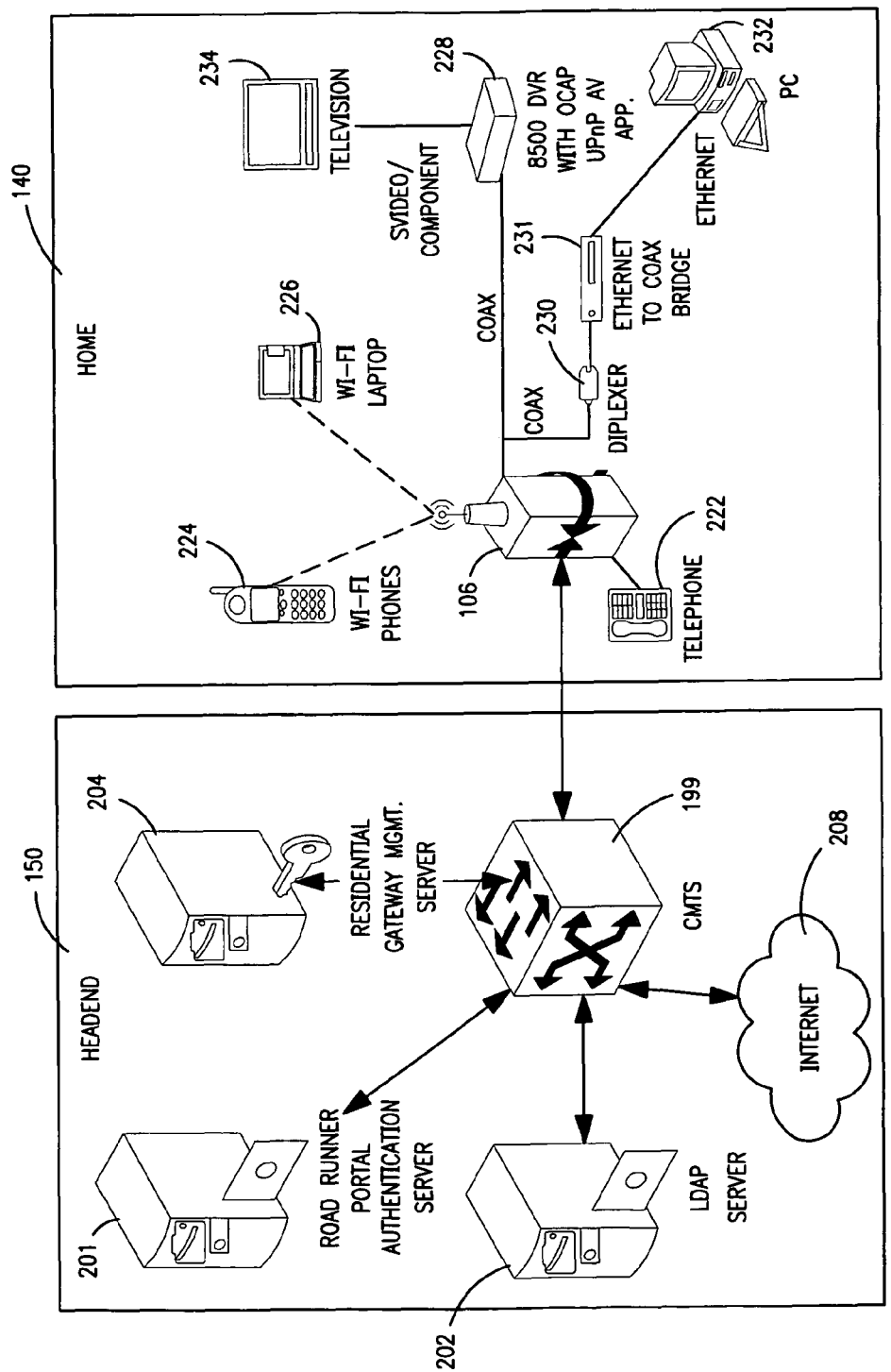
FIG. 2 is a functional block diagram of a content and data distribution network configured in accordance with one embodiment of the invention.

FIG. 2 is a block diagram of a premises network 200 and associated operator-side network elements configured in accordance with one embodiment of the invention. A portal authentication server 201, LDAP (Lightweight Directory Access Protocol) server 202 and gateway management server 204 are each coupled to a cable modem termination system (CMTS) 156, 199 of the type well known in the art. These components are located at the head-end 150 in the illustrated embodiment, although it will be appreciated that the components may be disposed at various other locations as desired consistent with the architecture implemented (e.g., at the BSA hub in a BSA network). The CMTS 156, 199 is coupled also to an internet (e.g., the Internet) 208 which is located external to the head-end 150, such as via an Internet (IP) backbone or gateway (not shown).

The CMTS 156, 199 is in the illustrated embodiment coupled to multiple households or other premises, including the exemplary illustrated household 240. In particular, the CMTS 156, 199 is coupled via the aforementioned HFC network and local coaxial cable or fiber drop to the premises 140, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a SIP phone, an H.323 terminal or gateway, etc. Additionally, the CPE 106 is also coupled to a digital video recorder (DVR) 228 and diplexer 230 via a coax cable. A network-to-coax bridge 231 places the coax environment in communication with a network (here, an Ethernet network complaint with IEEE Std. 802.3, although any number of other network protocols and topologies could be used) and a personal computer (PC) 232. The DVR 228 is also connected to a television or other monitor 234, which may be in communication via a wired or wireless interface (e.g., cabling, PAN or 802.15 UWB micronet, etc.).

A "home LAN" (HLAN) is created in the exemplary embodiment, which may include for example the network formed over the installed coaxial cabling in the premises (described in greater detail below), the Wi-Fi network, and so forth.

During operation, the CPE 106 exchanges signals with the 156, 199 over the interposed coax (and/or other, e.g., fiber) bearer medium. The signals include e.g., Internet traffic, digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 140.

Any number of different data flows may occur within the network 200. For example, the CPE 106 may exchange digital telephone signals from the CMTS 156, 199 which are further exchanged with the telephone unit 222 or the Wi-Fi phone 224. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network 200 may also interface with a cellular or other wireless system, such as for example a 3G IMS (IP multimedia subsystem) system, in order to provide multimedia calls between a user or consumer in the household domain 140 (e.g., using a SIP phone or H.323 terminal) and a mobile 3G telephone or personal media device (PMD) user via that user's RAN. See, e.g., co-owned and co-pending U.S. patent application Ser. No. 11/258,229 entitled "Method And Apparatus For On-Demand Content Transmission And Control Over Networks" filed Oct. 24, 2005, incorporated herein by reference in its entirety, wherein media can be streamed between a mobile unit and user CPE 106, including optionally in an on-demand or session-based fashion. For example, content downloaded to the CPE 106 of FIG. 2 herein could be streamed "on demand" to a mobile user, and similarly that mobile user (with proper authentication, etc.) could stream content captured by the mobile device to the CPE 106 for later viewing by that user, or by others within that user's family or "circle" of authorized viewers (sharing). So-called Push-to-talk (PTT) or "Push-to-anything" (PTx) session-based systems can also be used consistent with the invention, such as where a SIP-based device pushes a video clip or other media file to another device using an instantaneously generated SIP session over a 3G IMS or similar bearer coupled with a client device in the user domain 140.

The CPE 106 may also exchange Internet traffic (e.g., TCP/IP and other packets) with the CMTS 156, 199 which is further exchanged with the Wi-Fi laptop 226, the PC 232, or other device by way of a diplexer 230 and the exemplary coax bridge 231. CPE 106 may also receive digital programming that is forwarded to the DVR 128 or to the television 134. Programming requests and other control information may be received by the CPE 106 and forwarded to the CMTS as well. The CMTS routes the information to the corresponding subsystem within the headend 150 or to other systems located upstream from the CPE 106 (such as, for example, the switching hub in a broadcast switched architecture (BSA) network).

In another embodiment of the invention, a personal video encoder (PVE) or comparable device is used as part of or is in communication with the CPE 106 (or an associated client device coupled thereto). For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely so long as they have access to the IP distribution network. This functionality can be made part of a separate physical component, or alternatively have some or all of its functionality disposed within the CPE 106 itself. It may also be integrated with other devices (such as connected client devices or PMDs) as previously noted.

It will be appreciated that the PVE may also be updated itself via the network or other mechanism in terms of capabilities. For example, the PVE can receive new codecs or CA key data from the network so that it can modify its own configuration. These "upgrades" can also be passed through to the subscriber viewing device (e.g., remote PC).

It will also be recognized that the present invention may be used in conjunction with a number of different capabilities and features useful with traditional (prior art) CPE. For example, the error logging and reporting methods and apparatus described in co-owned and co-pending U.S. patent application Ser. No. 10/722,206 entitled "Methods and Apparatus for Event Logging in an Information Network" filed Nov. 24, 2003, which is incorporated herein by reference in its entirety. For example, the aforementioned disclosure describes methods and apparatus (including APIs) for logging errors that occur on client devices or CPE 106. In the present context, these errors can then be transmitted upstream to a responsible entity (e.g., management node, conditional access server, etc.) for further analysis or correction.

Similarly, the hardware registry apparatus and methods described in co-owned and co-pending U.S. patent application Ser. No. 10/723,959 entitled "Methods and Apparatus for Hardware Registration in a Network Device" filed Nov. 24, 2003, also incorporated herein by reference in its entirety may be used. This disclosure provides apparatus and methods for control of hardware within a networked electronic device (e.g., CPE) through use of a hardware registry. The registry contains records that correspond to an optional set of hardware functionality (e.g., personal video recorder). Each record (or set of records) may contains fields that: (i) identify the type of circuitry and peripherals, (ii) uniquely identifies circuitry and peripherals of the same type, (iii) specify parameters that are specific to the circuitry and peripherals types, and/or (iv) contain a reference to an application programming interface that can be used to access and manipulate the circuitry and peripherals. In one exemplary configuration, the CPE 106 is adapted to provide control over Host CORE optional circuitry for a digital video recorder (DVR) and digital video interface (DVI). A DVR/DVI application can therefore be downloaded to retail or leased set-top boxes and other consumer electronics equipment, which provides control of any available DVR/DVI circuitry found therein or functions associated therewith. This not only permits "after-the-fact" control of optional hardware features in a retail (third party) electronics device by the MSO or other system operator, but also allows for control and reconfiguration of leased devices after distribution to the end user(s). The CPE 106 described herein may either be of third-party or leased origin, and hence may benefit under either model when used in conjunction with the foregoing hardware registry approach.

The software interface management apparatus and methods described in co-owned and co-pending U.S. patent application Ser. No. 10/883,374 filed Jun. 30, 2004 and entitled "Apparatus And Methods For Implementation Of Network Software Interfaces", also incorporated herein by reference in its entirety, can be used within the CPE 106 or associated devices. Specifically, in one embodiment, network-specific programming interfaces (e.g., APIs) may be downloaded to the CPE, registered, authenticated, stored and executed in a software protocol stack implementing OpenCable Application Platform (OCAP) or Multimedia Home Platform (MHP) standards. The host device software comprises a "manager" module that registers APIs identified by the OCAP Monitor Application, such that all applications launched thereafter on the device can use these communications APIs, provided they have the appropriate permission(s). This relieves individual applications from having to support details regarding network-specific protocols and APIs. In an alternate embodiment, class and data files associated with the API functionality are downloaded along with an application. The downloaded application registers the API using a modified version of the API using a description file (DF). The DF describes the class and data files provided with the application that are part of the registered API.

In another aspect, the CPE 106 of the present invention is also compatible with the methods and apparatus disclosed in U.S. patent application Ser. No. 11/363,578 filed Feb. 27, 2006 and entitled "Methods And Apparatus For Selecting Digital Access Technology For Programming And Data Delivery", which is incorporated herein by reference in its entirety. Specifically, electronic devices such as set-top boxes, PMDs, or other types of equipment containing one or more hardware and software functions or modules are used; the hardware and software functions/modules of the different devices on the network contain various capabilities and options, including conditional access capabilities, video coding or compression capabilities, encryption schema, and network interfaces. These capabilities are utilized as a basis for determining which conditional access, coding, encryption, and/or network interfaces to utilize for delivery of content to each particular client device. The CPE 106 of the present invention can accordingly be equipped with such capability if desired in order to, inter alia, profile the CPE for tailoring content or other functions (e.g., CA) to that specific CPE environment. For example, if the CPE 106 (or any of its connected "client devices") has only an MPEG-2 decoder, only MPEG-2 encoded content would be sent to that CPE 106 (or passed on to the client devices), or alternatively the CPE or devices would obtain the necessary codec (e.g., MPEG-4 or Real) from another source, such as an MSO or third party website.

Exemplary CPE—

Figure 3:
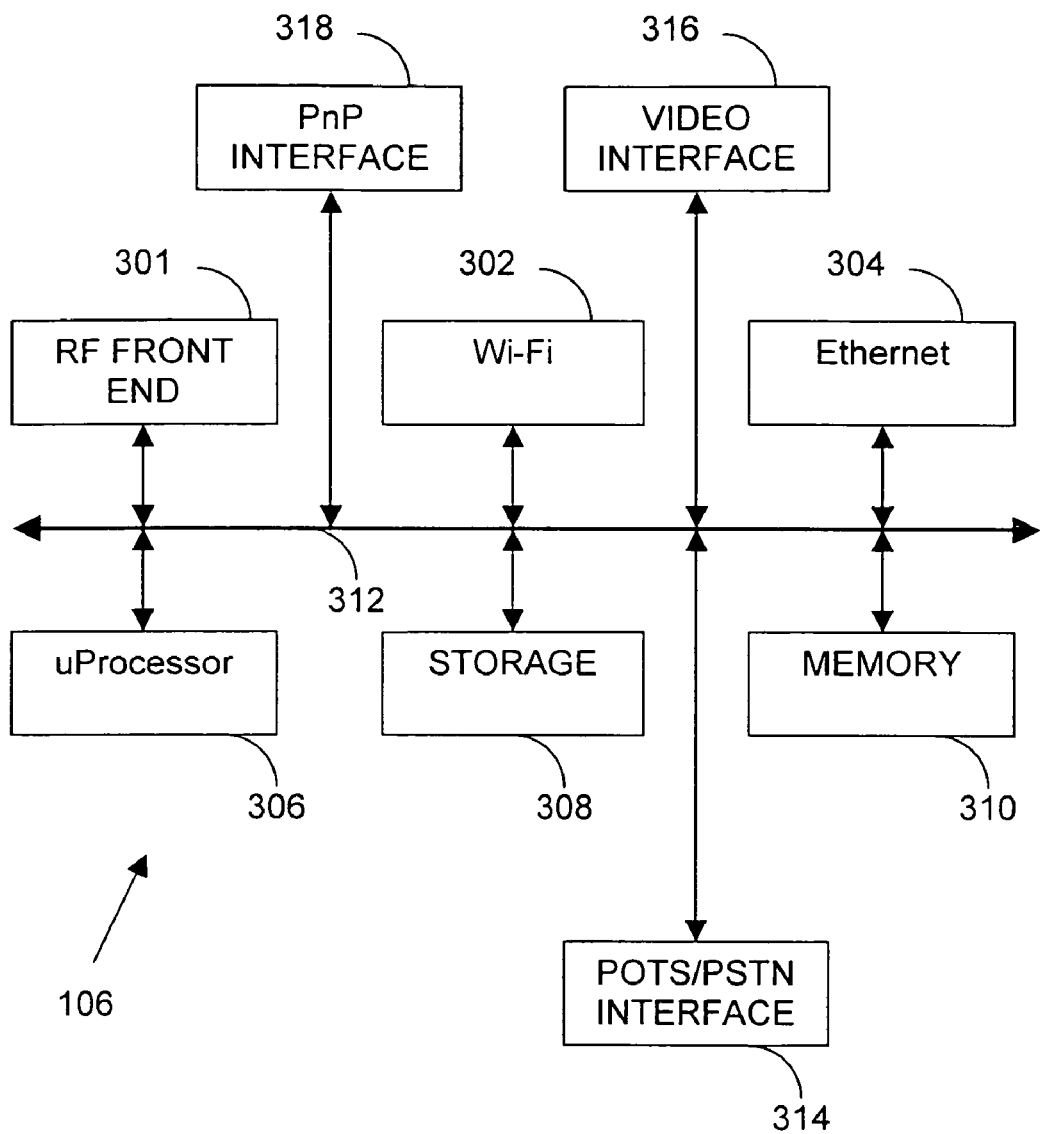
FIG. 3 is a functional block diagram of an exemplary centralized CPE unit configured in accordance with one embodiment of the invention.

FIG. 3 is a block diagram of one exemplary embodiment of the CPE 106 of FIG. 2. The exemplary CPE 106 (also colloquially known as a "hive" in certain configurations due to its centralized yet multifunctional nature) includes an RF front end 301, Wi-Fi interface 302, video interface 316, "Plug n' Play" (PnP) interface 318 and Ethernet interface 304, each directly or indirectly coupled to a bus 312. The microprocessor 306, storage unit 308, plain old telephone service (POTS)/public switched telephone network (PSTN) interface 314 (described in greater detail subsequently herein), and memory unit 310 are also coupled to the exemplary bus 312. The memory unit 310 typically comprises a random access memory (RAM) and storage unit 308 typically comprises a hard disk drive, an optical drive (e.g., CD-ROM or DVD), NAND flash memory, or some combination thereof.

The CPE 106 also optionally may include a network processing unit (e.g., network processor such as the Freescale/C-Port C-5 NP, not shown) to process the premises or home network (e.g., HLAN) services. The network processor is in one embodiment capable of processing 200 Mbps of real time Ethernet traffic, although other data rates may clearly be supported. The network processor also provides the ability to download firmware updates via TFTP or another selected protocol as desired.

The illustrated CPE 106 can assume literally any discrete form factor, including those adapted for desktop, floor-standing, or wall-mounted use, or alternatively may be integrated in whole or part (e.g., on a common functional basis) with other devices if desired.

It will be recognized that while a linear or centralized bus architecture is shown as the basis of the exemplary embodiment of FIG. 3, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

It will also be recognized that the CPE configuration shown is essentially for illustrative purposes, and various other configurations of the CPE 106 are consistent with other embodiments of the invention. For example, the CPE 106 in FIG. 3 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

Four (4) standard 10/100 Base T Ethernet ports for the purpose of a Home LAN connection are provided in the exemplary device of FIG. 3; however, it will be received that other rates (e.g., Gigabit Ethernet or 10-Gig-E) and local networking protocols (e.g., X.25, etc.) may be used. These interfaces may be serviced via a WLAN interface, wired RJ-45 ports, or otherwise. The CPE 106 also includes a plurality of RJ-11 ports for telephony interface, as well as a plurality of USB (e.g., USB 2.0) ports, and IEEE-1394 (Firewire) ports. S-video and other signal interfaces may also be provided if desired.

Various indications are optionally utilized within the CPE 106, including e.g., a WAN LED or other indicator to show cable modem link and activity. A LAN-802.3 LED or other indicator to show link and activity on one or more of the Ethernet ports, as well as a LAN-802.11 LED or indicator to show the radio interface is enabled, and activity. Telephony and other LEDs or indicators may also be provided using any number of schemes readily apparent to those of ordinary skill. Furthermore, a "soft" display (e.g., TFT or LCD display having software generated indications) may be used on the CPE 106 (or a remote device in communication therewith) to provide a flexible display environment. The methods and apparatus of co-owned and co-pending U.S. patent application Ser. No. 10/773,664 filed Feb. 6, 2004 entitled "Methods And Apparatus For Display Element Management In An Information Network", incorporated herein by reference in its entirety, may be used within the CPE 106 or other communicating devices. Specifically, display elements such as GUI windows or discrete indicators in a client device running multiple related or unrelated applications can be managed and controlled. In one embodiment, an improved window management entity is provided within the device with which HAVi-compliant application(s) can interface in order to access display elements according to a priority structure or hierarchy. One or more privileged applications are designated and allowed to affect the priority structure, including requesting a new in-focus application to be placed atop the priority structure. The network operator can also optionally control the operation of the window manager remotely via a network agent.

The CPE 106 mass storage device 308 of the illustrated embodiment comprises a Serial-ATA (SATA) or Ultra-ATA (also known as Ultra-DMA, or ATA-415/6/7) hard disk drive for the operating system and content storage of at least 300 GB, although higher capacities and even RAID arrays may be used for this purpose. The CPE 106 hard disk is preferably removable without the need for tools, and the CPE 106 is also configured allow for an external USB (e.g., USB 2.0) drive to be attached and automatically added to the existing storage. It will also be appreciated that USB keys of the type well known in the art can be used consistent with the USB port(s) of the CPE 106, so as to make the data storage device highly mobile and of very small size.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem (CM) of the type known in the art. In this fashion, and content or data normally streamed over the CM can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 140 (or outside this environment by way of a gateway or portal) via, e.g. the Wi-Fi interface 302, Ethernet interface 304 or PnP interface 318.

It will be appreciated, however, that the RF front end 301 of the CPE may comprise (either in addition to or in place of the CM) a traditional video RF front end 301 (e.g., tuner) adapted to receive video signals over, e.g., a QAM. For example, one exemplary embodiment of the RF front end 301 comprises one or more tuners, a demodulator, decryption module, and demultiplexer of the type well known in the art, although other configurations may be used. A wideband tuner arrangement such as that described in co-owned and co-pending U.S. patent application Ser. No. 11/013,671 entitled "Method and Apparatus for Wideband Distribution of Content" filed Dec. 15, 2004 and incorporated herein by reference in its entirety, may also be utilized, such as where the content associated with one or more program streams is distributed across two or more QAMs. Additionally, the RF front end 301 modulates, encrypts/multiplexes as required, and transmits digital information for receipt by upstream entities such as the CMTS or a network server. Digital data transmitted via the RF front end 301 may include for example MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Programming and other types of data including pictures, video, music or MP3 files, software applications, metadata files, etc. may also be received by way of the various digital interfaces in the CPE 106. These data may be stored locally (e.g., in the CPE storage unit 308) or even on a client device or network agent in communication with the CPE 106, for later use by a user. For example, a user may receive a JPEG or other image from a friend's cellular phone camera, which can then be "pushed" (e.g., via WAP push, IMS, Bluetooth™ OBEX K-11 exchange, etc.) to a corresponding interface on the CPE 106, wherein the image is stored on the mass storage device 308. Similarly, video data from a connected DVD player/burner might be streamed from the player to the CPE 106 for storage thereon (or distribution via yet another interface, such as via the Ethernet interface to the user's connected PC or via Wi-Fi interface to their laptop). Myriad different movements of myriad different types of data can be accomplished using the CPE, and herein lies one of its salient advantages; i.e., the ability to act as a substantially universal "hub" for moving (and transcoding, encrypting/decrypting, compressing, formatting, etc.) data between various different hardware and software environments.

The microprocessor 306 (or other dedicated processor; not shown) can also optionally be configured to run a server process (such as an http server process) that can be used by the remote system to view and configure the status of the CPE 106, such as via an http or other such browser application. The browser can, inter alia, display the list of files included on the mass storage unit 308, including the different media files, pictures and music files. The server process also can act as a proxy for other processes running on the CPE 106, thereby allowing for greater flexibility with respect to asynchronous interfaces of the CPE.

Other devices such as portable music players (e.g., MP3 players, iPods™, etc.) may be coupled to the CPE 106 via any number of different interfaces, and music and other media files downloaded for portable use and viewing. In accordance with one embodiment of the invention, the storage unit 208 may include a writable optical drive for writing media files to removable optical disks. So-called "Compactflash™" or other media may also be received within the CPE 016 (or a connected reader/writer), so that e.g., music files, digital camera image data, etc. can be readily moved from device to device (or from network environment to other network environment).

The present invention also contemplates the use of one substantially universal or converged interface and associated client device, such as a cellular telephone or PMD with PDA capabilities, image-quality digital camera, IMS or comparable media streaming, digital music/video player, Wi-Fi card or interface, Bluetooth transceiver, and so forth.

By incorporating the various components, interfaces, and functionality in the CPE 106 as described herein, a single system is capable of providing many of the services commonly employed to acquire and utilize media files and other digital information. Using a single system to provide these services increases user/subscriber economy and convenience. For example, a user may want to listen to music while viewing pictures. He/she may also want to burn an optical disk with music, video, and/or pictures (or some combination thereof). See, e.g., co-owned and co-pending U.S. patent application Ser. No. 11/080,693 filed Mar. 14, 2005, entitled "Method And Apparatus For Network Content Download And Recording" which is incorporated herein by reference in its entirety, for one exemplary recording-capable "client device" and associated methods that may be used consistent with the present invention. Locating all the files on a single unit with the ability to interface with other systems such as Wi-Fi, Firewire, USB, PAN, Ethernet, 5 GHz WLAN, etc. also advantageously allows the media files to be viewed by other systems or client devices connected to the CPE 106 via these interfaces.

In accordance with the exemplary embodiment of the invention, the CPE 106 includes a DOCSIS cable modem for delivery of traditional broadband Internet services. This connection is preferably shared by all Internet devices in the premises 140; e.g. IPTV devices, PCs, laptops, etc. In addition, the CPE 106 can be remotely managed (such as from the head end 150, or another remote network agent) to support IP services such as DHCP, DNS, NAT and firewall capabilities as well as anti-virus, pop-up blocking, and spyware protection.

The CPE 106 of the present invention (and parent network) may also be configured for alternate high-speed data capability (i.e., in addition to or in place of the cable modem high-speed data interface previously described). For example, in one exemplary variant, the CPE uses the methods and apparatus of co-owned and co-pending U.S. patent application Ser. No. 11/013,665 entitled "Method and Apparatus for High Bandwidth Data Transmission in Content-Based Networks" filed Dec. 15, 2004 and incorporated herein by reference in its entirety. Specifically, apparatus and methods disclosed therein for downloading data (such as large binary objects or files) at accelerated rates via a "point-to-point" approach, wherein a session is established between the receiving entity (such as the CPE 106) and the distributing entity (e.g., an OD server) using one or more allocated QAMs, and a program identifier. Session establishment and data flow control are implemented using protocols and bandwidth that are typically used for delivery and control of video-on-demand (VOD) or similar services, thereby obviating any substantive modifications to the existing network infrastructure. Sessions can be established for the data transfer, and then immediately terminated when the transfer is completed, thereby rapidly freeing up bandwidth on the network as with a conventional OD session. As described in greater detail subsequently herein, the CPE 106 may act as a VOD or application server proxy, and hence initiate and manage VOD or data download sessions on behalf of other devices within the premises network 140.

The CPE 106 also preferably creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, one embodiment of the invention uses frequencies on the order of 1150 MHz to deliver data and applications to other devices in the home such as PCs, PMDs, media extenders and set-top boxes. The coaxial network is merely the bearer; devices on the network utilize Ethernet or other comparable networking protocols over this bearer. The bridging device(s) 231 of FIG. 2 may take any number of forms including being embedded into other devices; e.g., as hardware/software/firmware within set top boxes, as a card or similar removable module, or alternatively comprising an external or stand-alone device for connecting PCs and other Ethernet based devices to the coax home network.

The exemplary CPE 106 shown in FIGS. 2 and 3 acts as a Wi-Fi access point (AP), thereby allowing Wi-Fi enabled devices (e.g., 12 in a typical configuration) to connect to the home network and access Internet, media, and other resources on the network. It will be recognized, however, that the CPE 106 may also act as a slave or station (STA) within an ad hoc or other Wi-Fi network, such as where another device on the premises 140 acts as the AP. The CPE 106 can include this Wi-Fi capability in a dedicated radio suite (e.g., one or more ICs or ASICs), as part of a larger SoC device, as a Wi-Fi card, or even as an external device that communicates with the CPE 106 or other associated device via a cable or similar connection.

The Wi-Fi interface also provide WEP, WPA and WPA2 encryption services of the type well known in the art on one or more connections. The interface 302 also may support other protocols, such as the EAP/802.1x Std. for authentication (e.g., using a RADIUS server or the like). Similarly, the CPE 106 can be configured for other types of secure network or tunneling capabilities, such as the WTLS layer in a WAP stack (e.g., where the CPE acts as a WAP gateway or proxy), or virtual private networking (VPN). MAC-level filtering may also be utilized.

In one embodiment, the Wi-Fi interface provides service over substantially all of the premises where it is used; however, other schemes for providing additional coverage can be used as well (such as "daisy-chaining" APs together, etc.). The interface's operating channel is set automatically by scanning for a free channel and initializing the access point on that channel.

The WAP shall preferably support four (4) unique SSIDs simultaneously. The WAP SSIDs shall preferably be configurable via a web page. The WAP SSIDs shall preferably be configurable remotely. The WAP firmware shall preferably be remotely upgradable. This will be done via the cable modem DOCSIS channel. The WAP shall preferably provide status information which includes connected devices MAC, IP address and connection speed. This status information shall preferably be available to remote monitoring systems.

The Wi-Fi phone 224 connects to high speed data services via the cable modem (CM) previously described, and allows the user to place calls through a digital phone service (e.g., Time Warner Cable digital phone server). Connection to the digital phone service (such as Time Warner Cable VoIP) advantageously allows current VoIP customers to use the CPE 106 as a telephony gateway, with the CPE 106 also providing EMTA functionality. In this fashion, digital phone customers are able to utilize the exemplary CPE 106 as a replacement for their current MTA/EMTA. By plugging traditional analog (e.g., POTS) phones into RJ-11 or comparable ports on the CPE 106, users/customers are able to place phone calls via digital telephone services (such as the aforementioned Time Warner Cable Digital Phone Service). It will be appreciated that a digital cordless (e.g., 900 MHz, 5 GHz, etc.) telephone or other similar device can be used in this capacity; the POTS interface is agnostic to the type of device used, so long as it complies with standardized telephony signaling and electrical/mechanical specifications. In the exemplary embodiment, the CPE 106 has all MTA functionality contained therein, such as via ICs and other electronic circuits and software as is well known in the digital telephony arts.

In accordance with another embodiment of the invention, a multi-mode (e.g., CDMA/Wi-Fi) capability is utilized, wherein the CPE 106 facilitates substantially seamless hand-offs of calls from the cellular (e.g., CDMA) network to the on-premises (e.g., Wi-Fi enabled) cable digital phone network. This hand-off may be physical in nature; e.g., it may be imposed by physical constraints or location, such as where the user departs home and wants to transfer an ongoing call from the Wi-Fi network to the cellular network (the Wi-Fi node only having a much more limited range). Alternatively, the handoff may be purely logical in nature, such as where the user is in range of both networks, but merely wishes to switch between them for a better long distance rate, features of one network versus another, and so forth.

One feature of the exemplary CPE 106 of FIG. 3 is the ability to act as a central content repository for video content delivered from DVRs or other such media devices in the premises. In order to accomplish this, various resources in the CPE 106 (including the RF tuners and disk drive(s)) are pooled. For example, the CPE 106 advantageously provides the ability to ingest content from DVRs or other such devices in the home via its Ethernet-over-coaxial interface. The CPE 106 can also discover STBs or other client devices in the home with Ethernet-over-coax capabilities, and generate a resource map table including tuners, disk drives and status, to be used when ingesting and streaming content. This also provides information for "pooling" of resources for each PC, PMD, etc. across the premises network.

In the illustrated architecture, content recorded from any DVR or similar device can be delivered to the CPE 106 via the Ethernet-over-coax connection, or another interface, for storage on the internal mass storage device or another connected device (e.g., RAID). Content may then be securely delivered to any viewing location in the home that shares a common security model via the various interfaces available, including e.g., Wi-Fi and Ethernet.

In accordance with another embodiment of the invention, a Universal Plug and Play (UPnP) AV media server is included within the CPE 106. The UPnP AV media server allows content such as music, videos and photos to be delivered to UPnP media rendering/recording devices in the home. Content delivered to UPnP rendering and decoding devices will typically be personal content which does not require rights management (e.g., DRM) or copy-protection. Alternatively, "protected" or DRM content can be delivered with the appropriate security package to a rendering device that can receive and authenticate the security package. In one variant, no rendering or recording device is permitted to render or record protected content without proper authentication to the CPE 106 (i.e., to assure that the UPnP or similar device is in fact authorized to receive the content). In another variant, the rendering device can be configured to authenticate the source of the content (i.e., will only render or record content from an authenticated source). For example, the apparatus and methods described in U.S. patent application Ser. No. 11/080,693 filed Mar. 14, 2005 previously incorporated herein can be used to provide such functionality, although other approaches may be used as well.

In accordance with another embodiment of the invention, set-top boxes or other CPE in the home (such as e.g., a DVR 128 enabled device) are able to render music, photos, video, or other media served by the CPE 106 by way of an OCAP-compliant application which works with the OCAP Digital Navigator application (or another comparable navigator). This client application typically contains the UPnP control point and rendering module needed to browse and display available content to the TV or another display device coupled to the STB.

Subscribers may use a web-based computer (e.g., PC) application to perform content upload, render and management operations on the CPE 106, although other software environments are contemplated as well. This web-based user interface (UI) can be indigenous, or delivered to the PC via a webserver running on the CPE 106. The application is adapted to identify whether one or more prerequisites needed to run the application (which might include for example the JAVA Runtime Environment, Microsoft.NET™ Framework 1.1, and or other applications) are satisfied. If these required applications are not available on the target computer, then the application will prompt the user, and offer to load the prerequisites before loading the aforementioned user interface. Once all prerequisites have been met, the web browser can be launched with the CPE 106 user interface.

The basic operations of the UI preferably include browsing the local computer for personal content or media such as photos, music and video, and (i) uploading it to the CPE 106, thereby allowing it to be shared throughout the premises; (ii) rendering the uploaded content back to the computer; (iii) managing the content on the CPE 106; and (iv) allowing remote access to the content from any Internet-enabled device capable of rendering the requested content.

The CPE 106 can also be configured with a speech recognition algorithm of the type well known in the art, thereby allowing the user to interface with the device using speech commands. A text-to-speech (TTS) capability may similarly be employed, and can interface with other client devices, etc. in communication with the CPE 106, so that text-based messages can be audibly delivered to the user. Such messages may also take the form of a screen display (e.g., CC or EAS (emergency alert), "ticker", pop-up window, etc.) and/or associated audio alert (such as EAS audio alerts). For example, the user's PC e-mail client may be coupled to the CPE 106 (and the connected display device or monitor) to permit the user to at least read their e-mail in real time as it is received while also watching the content on the display (e.g., a movie).

In accordance with one embodiment of the invention, subscribers or other users of the CPE 106 have the ability to access their personal content from any Internet connected PC, whether remote from or local to the CPE 106. They also have the ability to remotely program the DVR at the premises in order to record programs while they are away. For example, in one variant, the exemplary Time Warner Cable "Road Runner™" Portal is used to authenticate MSO subscribers, and redirect them to the CPE 106 in their premises. Remote access to the CPE 106 will typically be provided via the cable modem, although the present invention also contemplates the use of other channels (such as for example via a PSTN or cellular telephone, web server, etc.) to gain access to the CPE 106.

The DVD burner or other recording device associated with the CPE 106 can also be used to backup or store personal content and PC configuration files to DVDs. In another embodiment of the invention, a link or other such function resident on the web interface allows users to back up content via a DVD burner built into or integrated with the CPE 106. Alternatively (or in conjunction with the local backup option), data backup services can be provided via the network head-end 150. For example, personal PC data or configuration information can be delivered to a head-end storage facility (e.g., RAID array) via the DOCSIS cable modem interface or other upstream communications channel (e.g., an OOB upstream channel).

In one embodiment of the CPE 106, after installation thereof (whether self-install by the subscriber, or installation by a technician), the CPE 106 allows a subscriber or technician to use a web browser or similar familiar interface to configure simple home network parameters such as, e.g., those relating to DHCP, DNS and Firewall. This configuration may also be performed remotely by a central provisioning system, or locally as well.

Another module of the web interface provided by the CPE 106 allows the user to browse local content on their PC (or other connected devices) such as pictures, music, videos and other media or applications, and upload them to the CPE 106. This module also allows users to manage content via, e.g., "add", "delete", "move", and "rename" functions.

The CPE 106 UPnP server may also be configured to detect newly uploaded content, and/or changes made to stored content, and make this new or upgraded content available to network media rendering devices. This content "refresh" process can be event or occurrence driven (upon the occurrence of a given event such as receipt of a user-initiated "update" or "refresh" operation), periodically (e.g., every X minutes), or according to any number of other different schemes. In an alternate embodiment, for example, new content is signaled to the CPE 106 via a downstream message issued by the head-end server or another network agent/proxy, to which the CPE 106 responds with a refresh operation (download of the new content), and even optional alert to the user via a connected display device, audible cue, etc.

As described in greater detail below, another module of the exemplary web interface allows the user to view, on the PC or other device in data communication with the CPE 106, personal content served from the CPE 106 via the IP or other interface.

An optional DHCP server running on the CPE 106 manages IP address generation and dissemination on the coax, Wi-Fi, and other local networks in communication with the CPE 106. The cable modem (e.g., DOCSIS) interface of the exemplary embodiment is set to DHCP, and obtains an IP address from the CMTS DHCP server on the appropriate DOCSIS channel.

Internet and Wi-Fi phone traffic is preferably routed from both the coax and Wi-Fi interfaces to the cable modem interface. The CPE 106 also includes the means (e.g., a software module) for doing network address translation (NAT) of the Wi-Fi and coax interfaces, although it will be appreciated that other approaches to address management may be used as well.

Other DVRs or similar recording devices in the home can receive content from the hard drive or mass storage of the CPE 106, thereby allowing playback to happen at viewing locations other than the one where the content was recorded. These other locations may be in direct or indirect communication with the CPE; e.g., connected to or communicating with the CPE directly, or communicating via a gateway, router, or other intermediary device.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

In accordance with one embodiment of the invention, the CPE 106 system hardware complies with all FCC rules and regulations that apply to cable television equipment, as well all applicable UL rules and regulations. The exemplary CPE hardware operates on 110±20 VAC, 50-60 Hz, and includes the ability to send and receive a combined minimum aggregate bandwidth of 100 Mbps (summed over all interfaces).

In accordance with still another embodiment of the invention, the Ethernet port (e.g., 10/100/1000/10,000) or other network interface provides auto-negotiation capabilities (e.g., for connection data rate and half- or full-duplex). The exemplary Ethernet interfaces also provide auto-MDI/MDIX. This automatic MDI/MDI-X feature provides the ability to automatically detect the required cable connection type and configure the CPE properly to make use of the indigenous cable type. This feature effectively allows all Ethernet cables usable with any Ethernet device to be connected to the CPE 106 without any additional modification or external logic. In one embodiment, the CPE 106 can identify the cable connection type and adjust its MDI port to the cable by switching between the twisted and "straight" pairs. The auto switching function is typically accomplished prior to the auto-negotiation algorithm previously described, although other configurations are possible (e.g., a 'test-and-then-configure as needed" type approach). The CPE 106 can also optionally disable auto-negotiation and MDI/MDIX and can be manually configured.

The CPE 106 also optionally includes a MoCA, retail compliant F-connector for providing data over coax capability. The exemplary MoCA port operates in the 1125-1525 MHz band, although other frequencies (MoCA compliant or otherwise) may be used for this purpose if desired. The MoCA frequencies can be multiplexed onto the cable input port of the CPE 106, or sent over another channel (e.g., dedicated channel or interface).

The exemplary MoCA interface (not shown) of the CPE 106 is compliant with the Media Over Coax Alliance standard v1.0, September 2005. The MoCA interface has a maximum physical layer latency of 5 ms, and its transmitter does not exceed +3 dBm (58.1 dBmV). It operates over standard 75 Ohm RG-59 and RG-6 coax, and can be selectively disabled if desired.

The exemplary MoCA interface supports a minimum of 100 Mbps of effective data throughput, at 1364 byte or greater packet size, up to 68 dB of attenuation, and minimum 60 Mbps of effective data throughput at 1364 byte or greater packet size between 68 dB and 80 dB, although other performance capabilities may be used consistent with the invention. The MoCA interface of the illustrated CPE 106 also supports a minimum of 8 active nodes on the coax network.

The CPE 106 also provides a diagnostic mode that allows packet transfer to another device on the MoCA network to characterize the coax network. These diagnostics provide, inter alia, modulation scheme, data throughput, transmit power, receive power, packet or bit error rate (PER/BER), attenuation and SNR feedback from each device during the test. The CPE 106 is also configured to query the number of active devices attached to the MoCA network, and provide a list or output of the active devices based on MAC address.

The MoCA interface maintains at least a 1E-5 Packet Error Rate (i.e., less than or equal to this value). Furthermore, the MoCA interface is configured within the CPE 106 so as to not degrade video quality when it is co-located with a tuner, or interfere with a co-located DOCSIS interface or wireless (e.g., Wi-Fi) interface. In the exemplary embodiment, interference is mitigated or eliminated using an exemplary EMI (Faraday) noise shield of the type well known in the art, although other approaches (including for example specific component orientation and placement) may be used as well.

The CPE 106 also optionally includes a switched packet interface between the Ethernet port and the MoCA interface. In one embodiment, data traffic flows through the CPE 106 between the Ethernet or other network interface and MoCA ports without requiring host processor intervention.

The exemplary CPE 106 also provides "spanning tree" functionality in order to avoid or mitigate HLAN traffic loops between the switched Ethernet, Wi-Fi, and MoCA interfaces. A minimum packet size of 1364 bytes is specified when transferring video over the MoCA HLAN interface, although other minimum packet sizes can be used if desired. This packet size requirement insures that maximum effective throughput over the physical medium. RMON statistics for the Ethernet, Wi-Fi and MoCA interfaces can also be optionally provided to enhance CPE (and network) operational analysis.

The exemplary CPE 106 is also DOCSIS (e.g., 2.0) and PacketCable (e.g., Version 1.5) compliant. The exemplary firmware for the CPE 106 also supports CableHome 1.1 functionality, as well as CableOffice Commercial Annex Specification 1.0. A "residential gateway" mode is also supported within the firmware that provides network address translation (NAT) and routing functionality, optionally without receiving a CableHome configuration file.

The exemplary Wi-Fi wireless interface 302 is also configured to provide a plurality (e.g., four (4)) of unique service set identifiers (SSIDs) simultaneously. These SSIDs are configurable (locally or remotely), such as via a web page. The exemplary interface 302 also provides status information including for example the MAC of the connected devices, IP address and connection speed. This status information is also made available to remote monitoring systems. The interface firmware may also be made remotely upgradeable, such as for example via a cable modem (DOCSIS) channel. SNMP monitoring capabilities (which include active or inactive states, current channel, free channels, SSIDs and connected device number, MAC, IP address and connection speed) are also provided for the interface 302.

In one exemplary embodiment, the CPE 106 includes one or more omni-directional antennas, such as for example a 5.5 dBi gain "rubber duck" Omni antenna operating between 2400-2500 MHz. This antenna utilizes an impedance level of approx. 50 Ohm, with VSWR less than 2.0.

In accordance with another embodiment of the invention, the CPE 106 advantageously provides the ability to ingest content from DVRs or other such devices in the home via its Ethernet-over-coaxial interface. The CPE 106 can also discover STBs or other client devices in the home with Ethernet-over-coax capabilities, and generate a resource map table including tuners, disk drives and status, to be used when ingesting and streaming content. This also provides information for "pooling" of resources for each PC, PMD, etc. across the premises network.

The exemplary CPE 106 can also present a catalog of available content to the STBs/client devices using, e.g., the UPnP AV format. The CPE 106 can monitor the resources in the home and communicate contention issues to the STB/client device user interface as well.

The CPE 106 is also configured to receive and store security packages associated with encrypted content from DVRs or other devices in the premises network 140. The CPE 106 can deliver the security packages (and content to STBs/client devices) in the premises for playback. Note that the STB or client device that decodes the requested content may not be the same as the STB or other device that captured the content and delivered it to the CPE 106. The CPE 106 can also stream content or other data from a local hard drive (e.g., the mass storage device 308) to the HLAN or other interfaces. The CPE 106 can also stream content to multiple HLAN ports simultaneously from a single instance of the UPnP AV server, and supports Internet Group Management Protocol (IGMP) "snooping". The CPE 106 is also configured to be resistant/resilient to denial of service attacks on all WAN and HLAN interface.

In accordance with another embodiment of the invention, the underlying CPE 106 operating system (O/S) is configured to allow for individual software modules to be loaded and run. The exemplary embodiment of the CPE 106 supports DHCP server functionality for providing IP addresses to the home network via both the Wi-Fi and MoCA interfaces (as well as others if required). The CPE 106 can manually configure static IP addresses for requesting devices based on MAC address.

The CPE 106 may also be made compliant with the Digital Living Network Alliance (DLNA) requirements such as DLNA version 1.0 or the later version thereof. The CPE 106 can automatically discover all DLNA capable clients during boot up or other events, and present the available content catalog to one or more clients. The CPE 106 can automatically start a DLNA-compatible media server at boot using only the aforementioned MoCA and/or Wi-Fi network interfaces.

In this role, the CPE 106 is configured to poll the HDD once every n (e.g., 300) seconds for newly available content or content variation and propagate the list of available content to the PC 232 user interface and DLNA clients. This parameter is configurable from the user's web interface.

The CPE 106 provides the capability to transmit/deliver a plurality of SD and HD video formats including, without limitation, MPEG-1, MPEG-2, MPEG-4, AVC/H.264, WMV, VC-1, AVI and Real. The CPE 106 also is capable of transmitting/delivering a plurality of audio formats including e.g., MPEG-2 Audio, AC-3, AC-3+, AAC+, MP3, Real and WMA. A plurality of photo or image formats are also supported, including e.g., Graphic Image File (GIF), Joint Photographic Experts Group (JPEG), Bitmap (BMP) and Tag Image File Format (TIFF). The CPE 106 can also signal real-time streaming services that are available via the cable modem (e.g., DOCSIS) tuner resources.

In the exemplary embodiment, the CPE itself does not contain a decoder for decoding audio/video/media (this is essentially pushed off to the connected media rendering/recording devices); however, it will be recognized that such decoder capability (as well as transcoding, e.g. decoding in a first format and then encoding in a second format) can be implemented within the CPE 106 if desired.

One embodiment of the CPE 106 includes an algorithm that can assemble 1364-byte (or other numbers of bytes) packets when sending real-time video services via UDP in order to maximize physical layer effective throughput. This functionality improves the maximum effective throughput over the physical medium. The CPE can also send streaming video as a unicast service unless one or more devices are accessing the content simultaneously. In this event a multicast (including optionally broadcast) service can be used. This requirement attempts to preserve physical layer bandwidth. Along these lines, the methods and apparatus described in co-pending and co-owned U.S. patent application Ser. No. 11/325,107 filed Jan. 3, 2006 and entitled "Methods and Apparatus For Efficient IP Multicasting in a Content-Based Network", incorporated herein by reference in its entirety, can be used consistent with the invention. As one example, the methods and apparatus disclosed in the foregoing application can be utilized to eliminate or reduce wasted bandwidth associated with multicasting packetized content (including video or another such sizable transmission), and thereby increasing the overall efficiency of the content-based network within which the CPE 106 is utilized. In one exemplary variant, a "switched digital" network of the type described previously herein is used to (i) deliver packetized content only when requested, and (ii) selectively switch cable modems (CMs) or other such CPE to and from certain downstream channels (e.g., DOCSIS QAM-modulated RF channels) based on switching algorithms. These algorithms make use of the fact that in a typical "switched" environment, only a fraction of the available program channels are actually in use; hence, intelligent and timely switching of individual subscribers (or groups of subscribers) can allow for a great reduction in the number of downstream channels that must be allocated to delivery of the content. In the exemplary DOCSIS environment, the subscriber's cable modems are switched selectively among different downstream QAMs in similar fashion to the switched video previously described, thereby allowing for reduction in the total number of QAMs required to service the DOCSIS functionality (which may include both traditional IP-based network services, as well as high-bandwidth video or "IP TV" content). Advantageously, these cable modems can be rapidly switched with no re-ranging or registration, thereby allowing for a substantially seamless and low-overhead switching transient which is transparent to the user. The foregoing approach is particularly useful in the content of IP or similar "multicast" content that is targeted for multiple subscribers. Under the prior art, multicasting of such content would consume significant amounts of bandwidth on the downstream channels, since the multicast content was essentially replicated for each different subscriber. In contrast, the improvements provided by the present invention allow this multicast content to be delivered to multiple subscribers by selectively tuning the subscribers to common channels where the content is already being delivered to other subscribers, thereby allowing for a 1:N expansion of the content with minimal if any replication.

The CPE 106 can also act as a QOS policy enforcement point in the premises network 140. For example, the CPE 106 can receive and honor policy enforcement configuration files from the head-end or other provisioning system. An 802.1p tag or similar mechanisms can be used to identify QOS priority. For example, a "priority 1" tag can be inserted for streaming video, while a "priority 2" tag can be inserted for VoIP data, a tag of "priority 3" for audio only services, a tag of "priority 4" for all other services, and so forth. Other schemes (which may even be dynamic in nature based on, e.g., user preferences, management entity provisioning, etc.) may also be used consistent with the invention. The CPE 106 can configure the MoCA, Ethernet and other relevant interfaces to handle the data of these defined priorities in the proper order.

The CPE 106 may also include a remote diagnostics application that operates at least on the network processor (NP) core previously described. The CPE 106 provides remote diagnostics and control (including selectively disabling and/or reconfiguring the MoCA, Ethernet, Wi-Fi, or other interfaces remotely) accessible from one or more of the various interfaces, including the internal DOCSIS cable modem.

The software suite of the exemplary CPE 106 also provides a number of other diagnostic and monitoring functions, including: (i) RMON packet statistics from any of the premises LAN interfaces; (ii) the Ethernet port(s) configuration; (iii) speed, duplex, MDI/MDI-X, activity and link status; (iv) MoCA node configuration for each active MoCA node; (v) MoCA MAC control parameters from each active node on the network; (vi) MoCA PHY control parameters from each active node on the network; (vii) MoCA Vendor ID parameters from each active node on the network; (viii) MoCA traffic statistics from each active node on the network; (ix) running a Packet Error test between active nodes on each premises LAN device; (x) a backup feature whereby PC 232 or other client device configuration and files can be identified and stored on the CPE 106 for recovery in the event of a hardware/software failure on that device (including full and targeted or incremental backups).

The CPE 106 also provide a mechanism to identify new devices on the network and grant or deny network resources to the new device based on, e.g. conditional access privileges or business rules. The CPE 106 also includes a web interface for the user implemented via a lightweight web server. The CPE 106 may also insure that the PC 232 or other client device used to access this web interface is properly configured with the appropriate software to run the web application. This may include for example the JAVA Runtime Environment and the UPnP control point and media rendering software. If the PC 232 or client device does not meet these requirements, the web application will attempt to install the needed components on the PC such as by obtaining them locally (i.e., they may be stored on the mass storage device 308), or requesting or retrieving them from a network entity (e.g., the head-end 150, or a dedicated or third-party application server 104). However, the CPE 106 can also be configured to warn users that additional software is needed, and will be loaded, or giving the user the option to cancel the installation. The CPE 106 can also remotely launch the PC/client device user interface application once all software components are installed and operable. The CPE 106 web applications allow the user to browse local personal content on the PC and upload it to appropriate directories to the CPE 106. These directories include, e.g., directories for video, music, imagery, data, and so forth. These directories may also be selectively enabled by the user for sharing with others, so as to permit a third party to access the shared (i.e., image or music) folders with their friends, family, so forth, somewhat akin to the prior art Kodak Easyshare image sharing functionality. Sharing may also be subject to authentication and/or encryption procedures of the type well known in the art of desired.

As previously noted, the CPE 106 web applications also may provide the user content management actions that include "Move", "Copy", "Rename" and "Delete" functions. The user can also be provided with the ability to backup their personal content to DVDs via an internal DVD burner if installed, as well as to view any personal content (e.g., video, music, images, etc.) on the PC from the UPnP server on the CPE 106.

The CPE 106 web applications also provide the users the ability to monitor the home network and show connected MOCA and Wi-Fi devices. The CPE 106 web application is configured to present a consistent look and feel throughout the application, thereby simplifying user interface and making it more intuitive. The web application also can incorporate a "personalization engine" to provide user access control over protected content. Parental control rules invoked on the STB can also be carried over to the PC 232 or other client device application and remotely accessed content.

It will further be recognized that the present invention can be used in conjunction with a so-called "trusted domain" for content and other data protection if desired. Exemplary trusted domain apparatus (and methods) are described in co-owned and co-pending U.S. patent application Ser. No. 11/006,404 filed Dec. 7, 2004 and entitled "Technique For Securely Communicating Programming Content", as well as U.S. patent application Ser. No. 10/894,884 filed on Jul. 20, 2004 of the same title, each of the foregoing being incorporated herein by reference in its entirety. These applications disclose, inter alia, a multi-layered rights arrangement to prevent unauthorized use and transfer of protected content, especially in a home network. For example, the home network may be considered to comprise multiple layers. One such layer may be a "trusted domain," described in aforementioned U.S. application Ser. No. 10/894,884. For example, in a cable TV system, the trusted domain might include not only the system portion where programming content traditionally is secured by, and within total control of, a cable operator, including, e.g., the head-end, delivery network, etc., but also user devices, e.g., STBs or other CPE, at subscribers' premises which are capable of receiving and securely storing programming content in a prescribed manner. The cable operator can control certain subscriber access and usage with respect to content held within the trusted domain. For example, movie content held within a cable operator's trusted domain (e.g., on a hard drive of an STB or CPE) cannot be distributed over the Internet in viewable form and cannot become a source for duplication of multiple viewable copies. A second layer may be defined as being outside the trusted domain. A device in the second layer is assigned an indicator indicating an extent of security of the device. For example, when the device in the second layer requests transfer of protected content from a device in the first layer, the first layer device authenticates the second layer device to determine legitimacy of the device for receiving the protected content. After the second layer device is authenticated, the first layer device transfers not only the protected content, but also a set of rules associated with the protected content. At least some of the rules in the set are associated with the indicator and applicable to the second layer device with respect to use of the protected content.

The foregoing disclosures broadly encompass the concept of the multi-layered rights arrangement including the trusted domain for preventing unauthorized use of protected content. The invention is not limited to use of specific devices in the arrangement. For example, the invention equally applies to a host device connected to a CableCARD module, jointly realizing, e.g., the functionalities of a DVR STB or CPE. In an embodiment of the invention, the host device has programming content, which is encrypted, stored in storage therein. The module may receive a request from the device for accessing the programming content. The request includes a data package stored in association with the encrypted programming content in the storage. In response to the request, the module may determine that the device is allowed to access the programming content based on information (e.g., usage rights information) in the first data package. The module may then provide the host device at least data concerning a cryptographic element (e.g., an encryption key) for decrypting the encrypted programming content in the storage, thereby providing the device with access to the programming content.

So-called "DCAS" systems (downloadable conditional access systems) may also be used consistent with the invention in order to define/enforce trusted domains within the CPE environment 140, or other environments in data communication therewith.

The exemplary CPE 106 of FIG. 3 may also contain a secure microprocessor (e.g., security processor; not shown) which supports the trusted domain (such as, e.g., the Time Warner Cable Authorized Service Domain). The CPE 106 can transfer content from the Authorized Service Domain (ASD) to the DRM license domain for content viewed on the PC, or a PMD in communication with the PC 232 (FIG. 2) or CEP 106.

The CPE 106 also provides translation from different encryption environments if required, such as from 3DES to the AES cipher. The CPE 106 can also act as a proxy to a head-end license manager (or other management entity on the network) for content originating upstream of the head-end. For example, one variant of the invention contemplates a "local" or hub content manager entity disposed at the hub of the aforementioned BSA network.

In another variant, the CPE 106 also includes a Home phone networking (HPN) interface, which makes use of indigenous telephony wiring. Also commonly referred to as "HomePNA", this interface allows data interchange between various locations within a localized site such as a residence or small business. HPN systems are generally based on the specifications developed by the Home Phone Networking Alliance (HPNA). HPNA Standard 1.0, the original version of the standard, sets forth specifications for systems operating at 1 Mbps. Later versions of the standard, HPNA 2.0 and 3.0, are based on technology developed by, inter alia, Broadcom, and operates at a faster data rate (e.g., 10 Mbps and more).

Advantages of HPN systems include ease of installation, low cost, the ability to have multiple nodes on the network, compatibility with existing networking and PC technologies, and effectively constant data rate (largely independent of concurrent telephone voice signals). HPN systems also have the advantage of obviating expensive and complex server, hub, and router devices. The HPN interface of the CPE 106, when so equipped, uses phone jacks physically located near the desired locations of each computer, gateway, media device, or other network node. This HPNA interface can also communicate with other interfaces on the CPE 1-6, so as to provide seamless "pass through" of, for example IP packets generated by a PC connected through a telephony jack and wiring to the CPE 106, and then out through another interface (e.g., MoCA or Wi-Fi) to a personal media device or other such client device.

Figure 4:
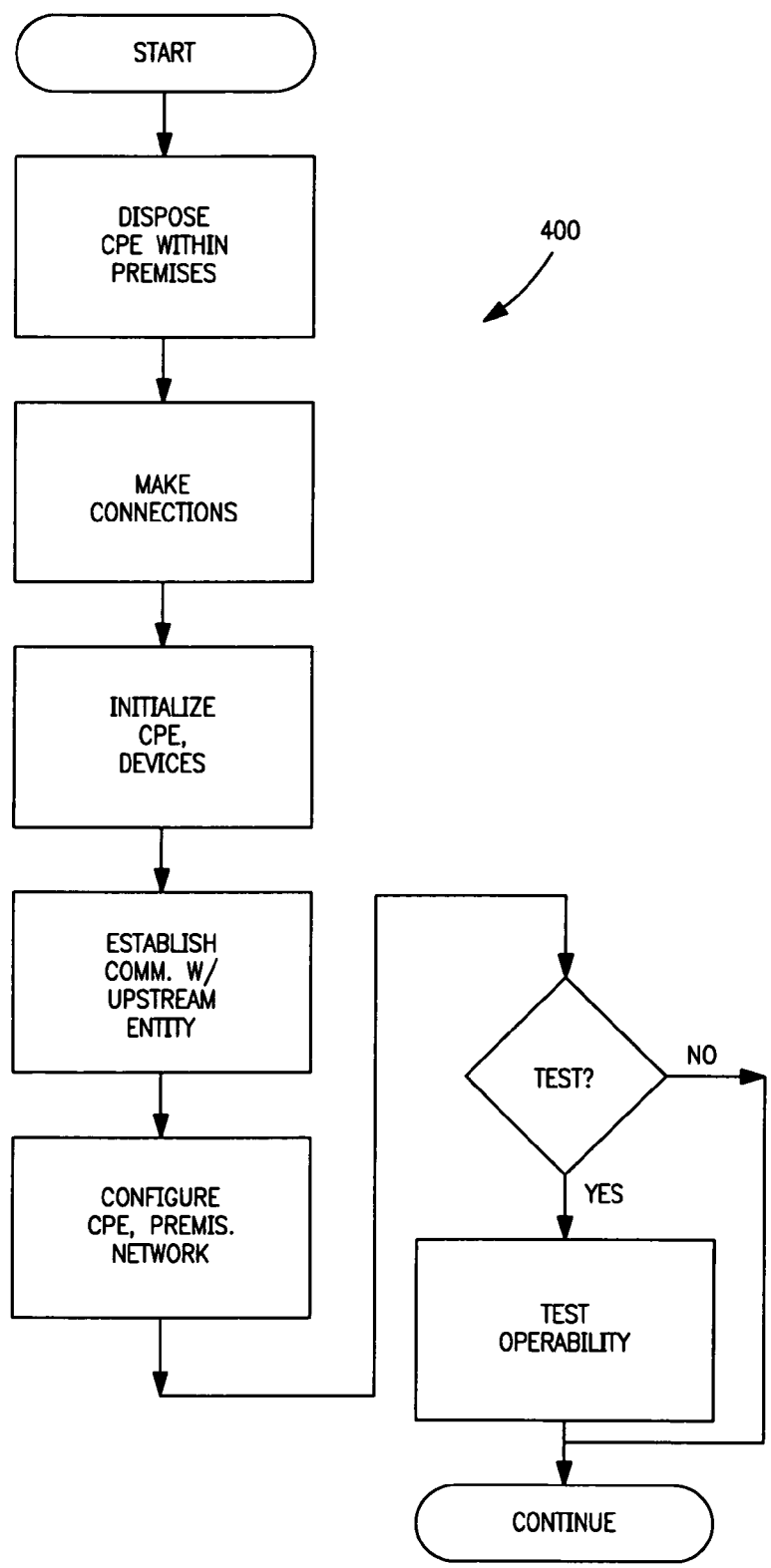
FIG. 4 is a logical flow diagram illustrating an exemplary embodiment of the method of remotely configuring the CPE of FIG. 3.

Referring now to FIG. 4, one exemplary embodiment of the method of configuring the CPE 106 of FIG. 3 within a content-based network is described.

Per step 402, the CPE 106 is disposed within a premises (e.g., residence, enterprise, etc.), and then coupled per step 404 to the relevant interfaces within the premises including, e.g., the coaxial cable drop at the point of entry into the premises, as well as to the indigenous coaxial cable routed throughout the premises (which will act as the basis of the packet-over-cable network within the premises as previously described).

Per step 406, the CPE 106 (and any associated or connected devices required to be configured) is started and initialized, such as via BIOS or other such initialization routine resident within the non-volatile storage of the device.

Per step 408, communication with the head-end 150 or another remote configuration entity is established (such as an upstream IP or OOB message to the MSO network head-end) to indicate that the CPE 106 is running and ready for configuration.

Per step 410, the CPE 106 and associated coaxial premises network is then remotely configured (via the aforementioned remote monitoring and configuration capabilities), such as from the head-end 150 or another remote location. This configuration may include, e.g., enabling/disabling various interfaces or capabilities based on factors such as the subscriber's desired services and subscription level, physical capabilities of the CPE 106 and the premises to accommodate certain functions, assigning network addresses, DNS parameters, gateways/subnet addressed and configurations, and so forth. The CPE 106 may also be configured with respect to security profile (i.e., required authentication, conditional access, encryption keys, etc.) if desired.

Per step 412, the operability of the various interfaces, network addressing, and other functions is optionally verified via a test routine. This routine may be run from the head-end or configuring entity, or alternatively may be run from the CPE 106 and remotely invoked by the head-end. For example, in one variant, the CPE is configured with a diagnostics and monitoring routine which periodically checks the status of the various system functions, as well as upon initialization/reconfiguration.

Figure 5:
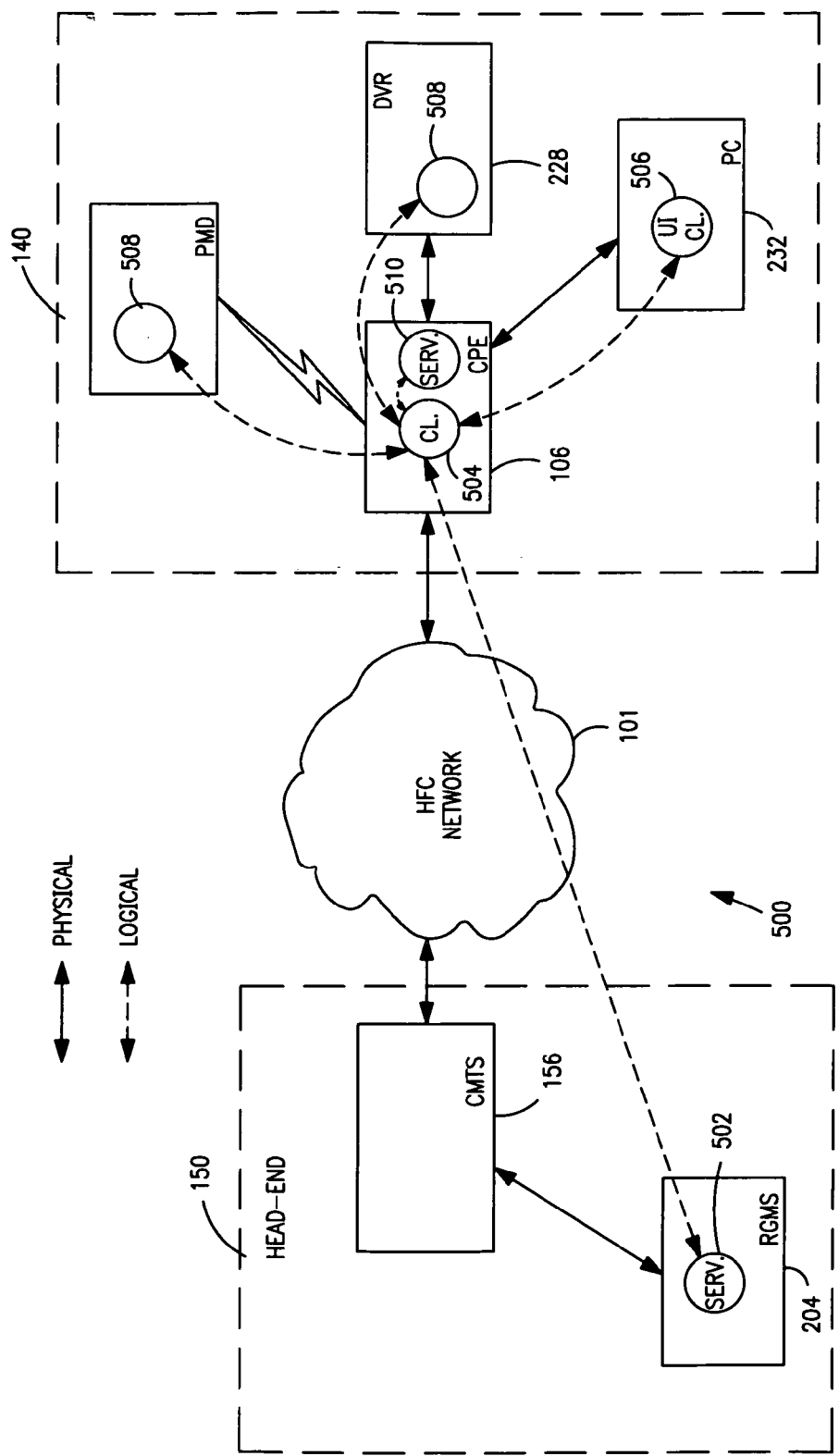
FIG. 5 is a graphical representation of one exemplary embodiment of the software architecture of the network of FIG. 2.

FIG. 5 illustrates one exemplary embodiment of a software architecture of the CPE 106 (and other communicating entities within the network. As shown in FIG. 5, the architecture 500 comprises a configuration "server" process 502, which may be disposed for example of residential gateway management server shown in FIG. 2, or another network agent if desired. By disposing the server process 502 at the head-end or BSA hub, the server process can advantageously configure and provision multiple CPE 106 simultaneously.

A corresponding client process 504 is disposed on each CPE 106; this process allows the CPE 106 to receive/send information from/to the server process 502, for e.g., remote configuration and provisioning of the CPE 106, monitoring of operations, statistics, status information, etc.

The client portion 504 may also be in logical communication with other processes within the premises, such as for example the user interface (and configuration) process 506 running on the PC 232. Client processes 508 on other devices, such as a wireless device coupled to the CPE 106 via the wireless interface, can also communicate with the CPE process 504.

As previously noted, the CPE 106 may also include various other processes 510, such as a media server, web or http server, and so forth. These can be used in a stand-alone fashion (e.g., where a PMD in the premises network merely accesses the media server in order to obtain stored personal content from the CPE 106), or as a local proxy for other distant servers (such as a remote third party web server, etc.).

It will also be appreciated that one or more of the CPE processes 504, 506, 510 can communicate with head-end or hub processes such as the authentication server (FIG. 2), IP telephony server (not shown), or even a VOD or application server (FIG. 1) if the CPE 106 is so equipped. For example, in one variant, the CPE 106 is configured to act as a STB VOD session proxy, utilizing e.g., LSCP or similar protocols to establish and manage VOD or other sessions on behalf of a connected STB, PMD or other device local within the premises.

The exemplary embodiment of the CPE 106 of the invention utilizes a Linux operating system, although it will be appreciated that any number of different operating systems and software environments can be utilized within the CPE 106. For example, the well-known Sun Microsystems Java environment can be used consistent with one or more functions, as can the Qualcomm "BREW" (binary runtime environment). Myriad different software architectures will be appreciated by those of ordinary skill provided the present disclosure.

Business/Operational Rules Engine—

In another aspect of the invention, a processing entity (e.g., rendered as one or more computer programs disposed on a head-end server or entity (e.g., VOD server/SRM), BSA hub entity, CPE 106, or other location) includes a so-called "rules" engine. This engine comprises, in an exemplary embodiment, one or more software routines adapted to control the operation of the CPE in order to achieve one or more goals relating to operations or business (e.g., profit). Included within these areas are network optimization and reliability goals, increased maintenance intervals, increased subscriber or user satisfaction, increased subscription base, higher profit (e.g., from increased advertising revenues, more subscriber "views" of given content, higher data download speed, increased bandwidth and responsiveness to changing demands for bandwidth, reduction of undue QAM replication, and so forth.

These rules may comprise a separate entity or process, and may also be fully integrated within other processing entities (such as the aforementioned CPE web application), and controlled via e.g., a GUI on a PC 232 connected to the relevant CPE or server. In effect, the rules engine comprises a supervisory entity which monitors and selectively controls CPE and premises network 140 operation processes at a higher level, so as to implement desired operational or business rules. The rules engine can be considered an overlay of sorts to the more fundamental algorithms used to accomplish required network operation, such as IP address assignment, statistical multiplexing, BSA switching, and so forth.

For example, the network or CPE may invoke certain operational protocols or decision processes based on information or requests received from the CPE, conditions existing within the network, demographic data, geographic data, etc. However, these processes may not always be compatible with higher level business or operational goals, such as maximizing profit or system reliability. Hence, when imposed, the business/operational rules can be used to dynamically (or manually) control the operation of the client process on the CPE or other devices within the premises. The rules may be, e.g., operational or business-oriented in nature, and may also be applied selectively in terms of time of day, duration, specific local areas, or even at the individual user level (e.g., via specific identification of the CPE or client device via TUNER_ID, MAC address, or the like).

For example, one rule implemented by the rules engine may comprise only providing certain types or formats of programming to certain subscribers or classes of subscribers. The subscriber CPE 106 may possess an MPEG-4 decoder, for example, but programs rendered in MPEG-4 encoding would not be made available to such subscribers unless they met certain criteria (e.g., "premium" subscription, etc.). Similarly, if the subscriber did not possess a required codec, CA keys, or network interface, the download of this missing component could be controlled to only subscribers meeting certain criteria.

Another rule might impose a moratorium or restrictions on upstream data or information messages (e.g., SSP) from the CPE during conditions of very heavy loading (e.g., until a certain minimum threshold of available bandwidth is present), thereby avoiding contention for bandwidth resources with "premium" services. Similarly, program-related or other processing typically, done upstream of the CPE could be dynamically shifted to the CPE under such circumstances so as distribute the processing load (and hence upstream messaging bandwidth consumed) to the CPE.

Yet another rule might impose restrictions on establishing or allocating new physical channels/QAMs to the subscriber channel requests based on CPE profile data (e.g., the presence of a certain required interfaces, codecs, CA, etc.). As previously discussed, bandwidth/QAM resource allocation and other relevant network considerations may be used as a basis of implementing or modifying user program requests in a broadcast switched network. This process can also be made dynamic if desired; such as where QAM loading and similar parameters can be continuously or periodically re-evaluated, and the operation of the network altered accordingly. For example, when sufficient bandwidth is again present, the subscriber of the previous example may be switched over to a program stream associated with the higher bandwidth codec.

The present invention also lends itself to various business models in terms of distribution, operation, and service provision. Specifically, by having remote monitoring, configuration and provisioning capability, the service provider (e.g., MSO) is given greater flexibility in, inter alia, (i) troubleshooting and repairing faults within the CPE 106 or other connected premises devices which may otherwise require a service visit; and (ii) changing or reconfiguring a given subscriber's service package or capabilities remotely, again obviating a service visit or actions by the subscriber. For example, as previously described, any of the interfaces on the CPE 106 can be selectively enabled or disabled remotely, thereby allowing the MSO to rapidly switch service options on a per-subscriber (per premises) basis. Using DCAS or other technology, the CPE 106 can also be reconfigured as a trusted domain for protected content received over the cable or satellite receiver (tuner). New versions or upgrades of software/firmware can readily be downloaded and installed as well. UPnP or other server processes on the CPE 106 can be configured using the remote provisioning capability also.

Hence, one variant of the business methodology of the invention contemplates delivery of substantially similar hardware/firmware environments to all subscribers, with each subscriber being able to tailor the capabilities of their individual CPE 106 (with, e.g., assistance or under control of the MSO) for their particular needs and premises. For example, some users may simply not want Wi-Fi capability, or VoIP telephony; hence, these interfaces could be disabled by the MSO. Others may not have installed coaxial cabling for establishing a cable premises network, and hence the MoCA interface could be disabled. Others may have local recording devices (e.g., DVR or the like) which may require configuration of the trusted domain to extend to these devices to permit subscriber purchase and in-home "burning" of content according to the methods previously discussed with respect to U.S. patent application Ser. No. 11/080,693 filed Mar. 14, 2005, entitled "Method And Apparatus For Network Content Download And Recording". As can be appreciated, literally an unlimited number of different premises/subscriber-specific configurations may be employed consistent with the CPE 106 of the invention, and hence it is typically more economical and efficient to allow user-specified (or even user implemented if desired) reconfiguration of a substantially generic device, as opposed to custom configured hardware for each subscriber/premises.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Premises content distribution apparatus for use with one or more media-capable devices, comprising:
a first interface configured to receive protected media content from a first network;
a mass storage device in data communication with said first interface and configured to store at least a portion of said protected media content; and
a second interface configured to provide networking throughout at least a portion of a premises;

wherein said premises content distribution apparatus is further configured to:
  maintain first and second security layers, said first security layer corresponding to devices within a secure network and having a first level of content protection associated therewith, said second layer corresponding to devices outside said secure network, yet having security thereof verified and having a second level of content protection associated therewith, said second level of protection being less than said first level;
  receive a request from one of said one or more media-capable devices via said second interface for transfer of said protected content;
  determine that said requesting media-capable device is associated with said second security layer;
  transfer said protected content to said requesting media-capable device; and
  transfer at least one rule to said requesting media-capable device, said at least one rule configured to restrict at least one of (i) playback; (ii) transfer; and/or (iii) replication of said transferred protected content by said requesting media-capable device;
wherein said at least one rule is selected from a plurality of available rules based at least in part on a determination that said requesting media-capable device is associated with said second security layer.

2. The apparatus of claim 1, wherein:
said second interface is configured to receive unprotected media content for storage on said mass storage device, said unprotected media content being generated by at least one of said one or more media-capable devices; and
said premises content distribution apparatus is configured to store said unprotected content, and distribute said unprotected content to one or more other devices without regard to content protection level thereof.

3. The apparatus of claim 1, wherein said apparatus in data communication with one or more server processes configured to generate one or more lists of said protected media content accessible to said requesting media-capable device.

4. The apparatus of claim 1, wherein said networking throughout at least a portion of said premises is provided at least in part by at least one wireless access point within said premises.

5. The apparatus of claim 1, wherein said networking throughout at least a portion of said premises is provided at least in part by an Internet protocol (IP) network.

6. The apparatus of claim 1, wherein said apparatus further comprises a video interface configured to generate video signals operative to drive a video monitor.

7. The apparatus of claim 6, wherein said apparatus is further configured to, substantially simultaneously:
  generate video signals based at least on a first media file; and
  transmit digital data associated with a second media file via at least one of said first and second interfaces.

8. Premises content distribution apparatus for use with one or more media-capable devices, comprising:
  a first interface configured to receive encoded media content from a first network, said encoded media content being received according to a first packet protocol and encapsulated via a second packet protocol; and
  a second interface configured to provide networking throughout at least a portion of a premises; and
  wherein said premises content distribution apparatus is further configured to:
    assemble said encapsulated and encoded media content from said first packet protocol;
    maintain first and second security layers, said first security layer having a first level of content protection associated therewith, said second layer having a second level of content protection associated therewith, said second level of protection being less than said first level;
    receive a request from one of said one or more media-capable devices via said second interface for transfer of said encoded content;
    authenticate said requesting media-capable device as being associated with said second security layer;
    transmit said encapsulated media content to said requesting media-capable device via said second packet protocol; and
    transfer at least one rule to said requesting media-capable device, said at least one rule configured to restrict at least one of (i) playback; (ii) transfer; and/or (iii) replication of said transferred encoded and protected content by said requesting media-capable device.

9. The apparatus of claim 8, wherein said second packet protocol comprises said Internet Protocol (IP).

10. The apparatus of claim 9, wherein said first packet protocol comprises a Motion Picture Experts Group (MPEG) protocol, and said encoded media content is encoded based at least in part on either an MPEG-2 or H.264 codec.

11. The apparatus of claim 9, wherein said premises content distribution apparatus further comprises a mass storage device, and is further configured to:
  de-encapsulate said encapsulated and encoded media content from said IP protocol;
  store said de-encapsulated and encoded media content on said mass storage device; and
  before said transmission, re-encapsulate said stored de-encapsulated media content in accordance with said IP protocol.

12. The apparatus of claim 8, wherein said transmission of said encapsulated media content comprises an IP multicast, said multicast also comprising a transmission of said encapsulated media content to other ones of said media-capable devices.

13. The apparatus of claim 8, wherein said second interface comprises a wireless access interface comprising an IEEE-Std. 802 compliant access point (AP).

14. The apparatus of claim 8, wherein said first and second interface are in data communication with one another.

15. The apparatus of claim 8, further comprising an apparatus configured to communicate with said first interface to pass IP-based telephony data between a user of said premises and said first network.

16. The apparatus of claim 15, wherein said first interface comprises a DOCSIS-compliant cable modem, and said apparatus configured to communicate comprises an embedded multimedia terminal adapter (eMTA).

17. The apparatus of claim 8, wherein said apparatus further comprises a trusted domain for content received over said first interface, said individual ones of said one or more media-capable devices having a security level within said trusted domain.

18. The apparatus of claim 8, wherein said apparatus is remotely accessible via said first interface and said first network.

19. The apparatus of claim 8, further comprising a downloadable conditional access system (DCAS).

20. A method of content distribution for use with a plurality of media-capable devices, said method comprising:
  storing protected content received from a first network;

enabling networking between said plurality of media-capable devices;

receiving a request from one of said plurality media-capable devices for transfer of said protected content, said request being made via a second network;

upon a determination that said requesting media-capable device is associated with a first of two security layers, transferring said protected content, and transferring at least one rule to said requesting media-capable device, said at least one rule restricting at least one of (i) playback; (ii) transfer; and/or (iii) replication of said transferred protected content by said requesting media-capable device;

wherein said second security layer corresponds to devices within a secure network and having a first level of content protection associated therewith; and wherein said first layer corresponds to devices outside said secure network, yet having security thereof verified and having a second level of content protection associated therewith, said second level of protection being less than said first level.

21. The method of claim 20, wherein said networking between said plurality of media-capable devices comprises networking over a power line interface for exchanging data over power lines.

22. The method of claim 20, wherein said protected content is received from a content server in an external hybrid fiber coax (HFC) cable network.

23. The method of claim 20, wherein said protected content comprises at least one of personal music, video and images, and said requesting media-capable device comprises a Universal Plug-and-Play (UPnP)-compatible device.

24. A method of content distribution for use with one or more media-capable devices, said method comprising:

receiving protected encoded media content from a first network, said encoded media content being received according to a first packet protocol and encapsulated using a second packet protocol;

constructing said encapsulated and encoded media content from said first packet protocol;

receiving a request from an authenticated one of said one or more media-capable devices via said second interface for transfer of said encoded content;

transmitting said encapsulated media content to said requesting media-capable device using said second packet protocol; and when said requesting media-capable device is associated with a first security layer, transferring at least one rule thereto;

wherein said first security layer comprises a level of content protection associated therewith, which is less than a level of content protection associated with a second security layer; and wherein said at least one rule restricts at least one of (i) playback; (ii) transfer; and/or (iii) replication of said transferred encoded and protected content by said requesting media-capable device.

25. The method of claim 24, wherein said act of managing network traffic throughout said premises provides access to a shared internet connection for said one or more media-capable devices.

26. The apparatus of claim 25, wherein said shared internet connection is provided by a modem, and said shared internet connection comprises a connection to a hybridized fiber network.

27. The apparatus of claim 25, wherein said shared internet connection is provided by a radio frequency tuner, and said shared internet connection comprises a satellite network.

* * * * *